US012574436B2

(12) United States Patent (10) Patent No.: US 12,574,436 B2
Yang et al. (45) Date of Patent: Mar. 10, 2026

(54) BLOCKCHAIN MACHINE BROADCAST PROTOCOL WITH LOSS RECOVERY

(71) Applicant: XILINX, INC., San Jose, CA (US)

(72) Inventors: Ji Yang, Coram, NY (US); Haris Javaid, Singapore (SG); Sundararajarao Mohan, Sunnyvale, CA (US); Gordon John Brebner, Monte Sereno, CA (US)

(73) Assignee: XILINX, INC., San Jose, CA (US)

( * ) Notice: Subject to any disclaimer, the term of this patent is extended or adjusted under 35 U.S.C. 154(b) by 440 days.

(21) Appl. No.: 17/743,421

(22) Filed: May 12, 2022

(65) Prior Publication Data

US 2023/0370521 A1 Nov. 16, 2023

(51) Int. Cl.
*H04L 67/1074* (2022.01)
*G06F 16/23* (2019.01)

(52) U.S. Cl.
CPC ........ *H04L 67/108* (2013.01); *G06F 16/2379* (2019.01)

(58) Field of Classification Search
CPC ........................... H04L 67/108; G06F 16/2379
See application file for complete search history.

(56) References Cited

U.S. PATENT DOCUMENTS 10,375,105 B2 8/2019 Kozloski et al.
10,762,479 B2 9/2020 Hyun et al.

2010/0020689 A1* 1/2010 Tang ........................ H04L 69/16
370/235
2015/0117200 A1* 4/2015 Patel ........................ H04L 47/27
370/235
2019/0253477 A1* 8/2019 Nolan ..................... H04L 47/34
2019/0370806 A1 12/2019 Wang et al.
2020/0076673 A1* 3/2020 Hao ........................ H04L 45/74
2020/0143088 A1 5/2020 Sunkavalli et al.
2021/0211467 A1* 7/2021 Naeimi ............... H04L 63/0245
2022/0156249 A1* 5/2022 Luedtke ............. G06F 16/2379
2024/0029157 A1* 1/2024 Chen ..................... G06Q 40/04

OTHER PUBLICATIONS

U.S. Appl. No. 17/084,942, filed Oct. 30, 2020 Entitled "Blockchain Machine Network Acceleration Engine".

* cited by examiner

*Primary Examiner* — Brian J. Gillis
*Assistant Examiner* — Juan C Turriate Gastulo
(74) *Attorney, Agent, or Firm* — Patterson + Sheridan, LLP

(57) ABSTRACT

The embodiments herein describe a communication protocol (which can be implemented in hardware or software) that provides efficient recover packet loss and can transit large messages in a complex network environment. In one embodiment, each data packet contains an encoded universal sequence which is unique across the sends, which enables cross-sender loss recovery. A receiver can include a transmission control module that controls the receiving buffer and maintains the buffer status and the sender's status. The transmission control module stores incoming packets to the correct position in the receiving buffer and generates acknowledgement notifications. The transmission control module also handles packet loss and out-of-order receiving of the packets containing the transactions.

20 Claims, 18 Drawing Sheets

BLOCKCHAIN MACHINE BROADCAST PROTOCOL WITH LOSS RECOVERY

TECHNICAL FIELD

Examples of the present disclosure generally relate to a hardware accelerator for a node in a blockchain.

BACKGROUND

Hyperledger Fabric is an open-source, enterprise-grade implementation platform for permissioned blockchains. The transaction flow in Hyperledger Fabric follows the execute-order-validate model, where a transaction is executed first, then ordered into a block, which is finally validated and committed to the ledger (along with a state database to keep the global state of the blocks committed so far). Consequently, a Fabric network includes different types of nodes, such as peers, orderers, clients, etc., where each node has an identity provided by the Membership Service Provider (MSP).

Permissioned blockchains (like Hyperledger Fabric, Quorum, Corda, and others) are blockchain networks that require access to be part of. These blockchains require transactions to be validated before they are added to the blockchain's ledger. However, the validation process must be performed by certain nodes which often experience a bottleneck when having to validate multiple transactions. This bottleneck can limit the ability of the blockchain to quickly commit new transactions.

SUMMARY

One embodiment describes a computing system that includes a processor, a memory storing a ledger of a blockchain, and a hardware accelerator. Thus hardware accelerator is configured to receive a plurality of packets corresponding to a block of transactions to be committed to the ledger, in response to determining a first packet of the plurality of packets is received out of order relative to a defined sequence for the block of transactions, transmitting, to a sender, an acknowledgement for a second packet of the plurality of packets that was received before a missing packet, and receiving the missing packet. One of the processor or the hardware accelerator is configured to, upon determining the block of transactions is ye/id, commit the block of transactions to the ledger.

Another embodiment described herein is an integrated circuit a protocol processor configured to receive a plurality of packets corresponding to a block of transactions, in response to determining a first packet of the plurality of packets is received out of order relative to a defined sequence for the block of transactions, transmitting, to a sender, an acknowledgement for a second packet of the plurality of packets that was received before a missing packet, and receiving the missing packet. The integrated circuit also includes a block processor configured to validate the block of transactions in an order dictated by the defined sequence.

Another embodiment described herein is a method that includes receiving a plurality of packets corresponding to a block of transactions, in response to determining a first packet of the plurality of packets is received out of order relative to a defined sequence for the block of transactions, transmitting, to a sender, an acknowledgement for a second packet of the plurality of packets that was received before a missing packet, receiving the missing packet and validating the block of transactions in an order dictated by the defined sequence.

BRIEF DESCRIPTION OF DRAWINGS

So that the manner in which the above recited features can be understood in detail, a more particular description, briefly summarized above, may be had by reference to example implementations, some of which are illustrated in the appended drawings. It is to be noted, however, that the appended drawings illustrate only typical example implementations and are therefore not to be considered limiting of its scope.

DETAILED DESCRIPTION

Figure 1:
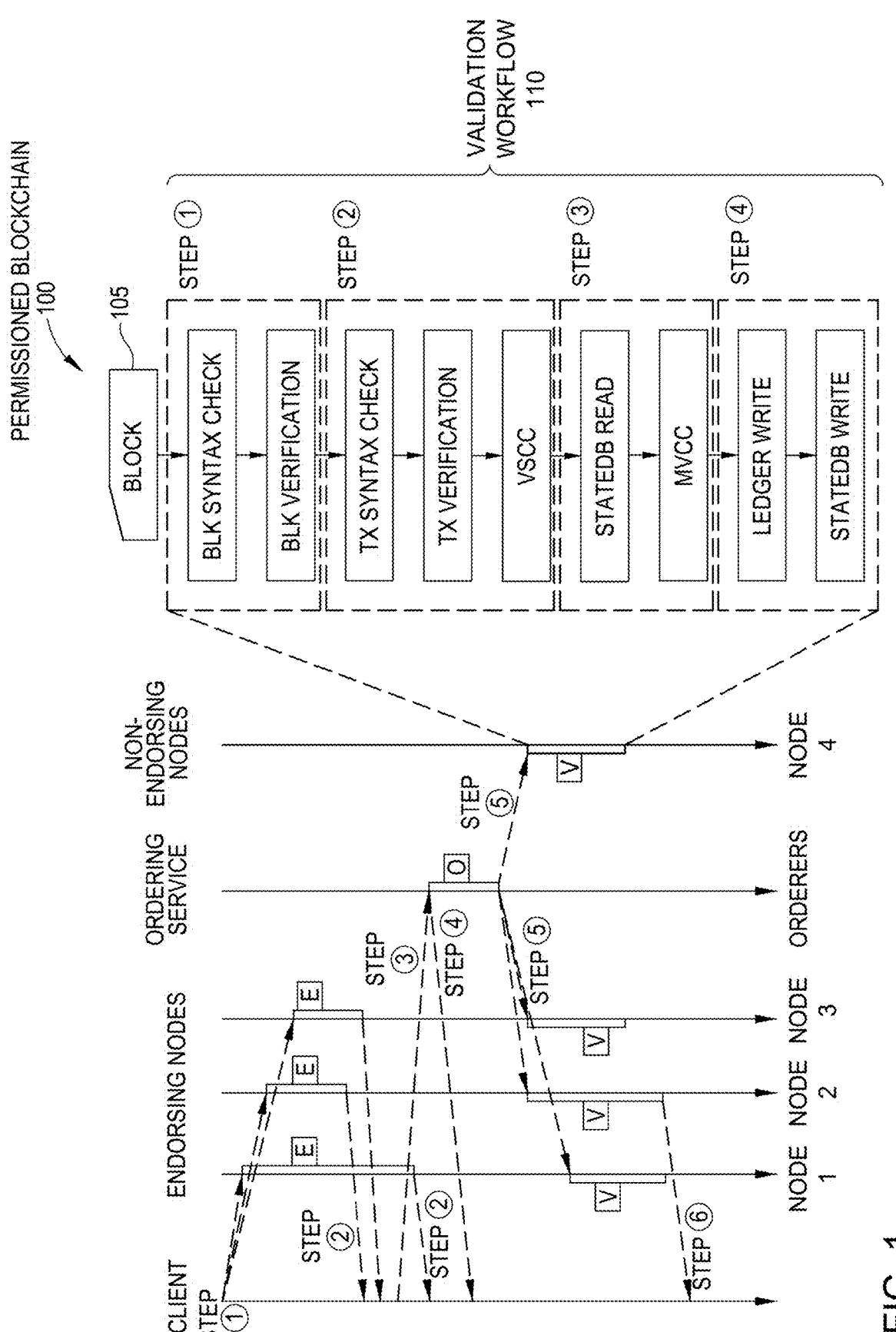
FIG. 1 is a timing chart corresponding to a permissioned blockchain, according to an example.

Various features are described hereinafter with reference to the figures. It should be noted that the figures may or may not be drawn to scale and that the elements of similar structures or functions are represented by like reference numerals throughout the figures. It should be noted that the figures are only intended to facilitate the description of the features. They are not intended as an exhaustive description of the description or as a limitation on the scope of the claims. In addition, an illustrated example need not have all the aspects or advantages shown. An aspect or an advantage described in conjunction with a particular example is not necessarily limited to that example and can be practiced in any other examples even if not so illustrated, or if not so explicitly described.

Embodiments herein describe a hardware accelerator (e.g., a network acceleration engine) for a blockchain machine or node. The hardware accelerator parses packets containing separate components of a block of transactions to generate data to perform a validation process. That is, data transmitted using a network protocol (e.g., TCP (Transmission Control Protocol)) is typically ill suited to be used by a hardware accelerator without the packets first being processed by software. To avoid the latency that comes with using software, the embodiments herein describe a protocol processor in the hardware accelerator that parses the packets and prepares the data so it can be consumed by downstream components in the accelerator without software intervention. These downstream components can then perform a validation operation to validate one or more transactions before those transactions are committed (i.e., added) to a ledger of a permissioned blockchain.

The embodiments herein describe a communication protocol (which can be implemented in hardware or software) that provides efficient packet loss recovery and can transmit large messages in a complex network environment. In one embodiment, each data packet contains an encoded sequence number which is unique across the senders, which enables cross-sender loss recovery. The receiving blockchain machine or node (i.e., the receiver) can include a transmission control module that controls the receiving buffer and maintains the buffer status and the sender's status. The transmission control module stores incoming packets to the correct position in the receiving buffer and generates acknowledgement notifications. The transmission control module also handles packet loss and out-of-order receipt of the packets containing the transactions. When there are multiple senders, the transmission control module can prioritize the fast senders for sending the new data, while using slower senders to recover lost packets.

FIG. 1 is a timing chart corresponding to a permissioned blockchain 100, according to an example. While the timing chart of the permissioned blockchain 100 in FIG. 1 specifically pertains to the Hypededger Fabric, the embodiments herein can apply to any type of permissioned blockchain. Further, the embodiments herein may also apply to nonpermissioned blockchains that perform a validation process on transactions before those transactions are committed to the ledger. Thus, the Hyperledger Fabric is provided as just one example of a suitable blockchain network that can benefit from the hardware accelerator described below.

The transaction flow in the blockchain 100 follows an execute-order-validate model, where a transaction is executed first, then ordered into a block, which is finally validated and committed to the ledger (along with a state database to keep the global state of the blocks committed so far). Consequently, the permissioned blockchain 100 includes different types of nodes, such as peers, orderers, clients, etc., where each node has an identity provided by the MSP. This identify can be provided in the form a certificate.

The client can be any entity that submits a transaction to be committed on the blockchain 100. For example, if the blockchain 100 is used by a financial institution to track money transfers, the client may submit a transaction to move funds from a first account to a second account (at the same financial institution or a different institution). At step 1, the client submits a transaction to be committed to the blockchain. Specifically, the transaction is received on multiple endorsing nodes (or peers). An endorsing node both executes/endorses transactions and validates/commits blocks to the ledger. Each endorsing node executes the transaction against its own state database, to compute the read-write set of the transaction (marked as E in FIG. 1). The read set is the keys accessed and their version numbers, while the write set is the keys to be updated with their new values.

If the endorsement process is successful (i.e., there are no errors), at step 2, the endorsing nodes add their endorsement to the transaction and return the transaction to the client. After the client has gathered a sufficient number of endorsements, at step 3, the client asks an ordering service to submit the transaction to a validation process. In one embodiment, the ordering service includes orderers (e.g., computing nodes) which use a consensus mechanism to establish a total order for the transactions. Multiple pluggable consensus mechanisms are available, such as Raft and Apache Kafka/Zookeeper based consensus mechanisms.

At step 4, the ordering service responds back to the client after the transaction has been accepted for inclusion into a block (step 4). The ordering service then creates a block 105 of transactions from the ordered transactions. In one embodiment, the ordering service creates the block 105 from the ordered transactions when either a user-configured timeout has expired or user-configured limit on block size is reached.

Once a block 105 is created, the ordering service broadcasts it to all the endorsing and non-endorsing nodes through, e.g., a Gossip protocol at step 5, Each node validates all the transactions in the block 105 and then commits the block to the ledger and state database (marked as V). Finally, one of the nodes sends a notification to the client that the transaction has been committed or whether the transaction was marked as invalid or valid in the ledger (step 6).

FIG. 1 shows a validation workflow 110 of the validation phase in more detail on the righthand side. The workflow 110 shows four steps which are performed on every node that receives the block 105. On receiving the block 105 of transactions from the ordering service (or a lead node) through the Gossip protocol, at step 1, the node checks the syntactic structure of the block and verifies its signature, and then sends it through a pipeline of various operations which are described in more detail blow. In step 2, each transaction in the block is syntactically checked and its signature is verified. Then validation system chaincode (VSCC) is run on each transaction where the endorsements are validated and the endorsement policy of the associated chaincode is evaluated. A transaction is marked as invalid if its endorsement policy is not satisfied.

In step 3, a multi-version concurrency control (MVCC) check is performed. This check ensures that there are no readwrite conflicts between the valid transactions. In other words, it avoids the double-spending problem where two transactions are committed when only one transaction was intended. The read set of each transaction is computed again by accessing a state database (illustrated as "statedb" in FIG. 1) and is compared to the read set from the endorsement phase. If these read sets are different, then some other transaction (either in this block 105 or an earlier block) has already modified the same keys, and hence this transaction is marked as invalid.

In the final step 4, the block is committed to the stored ledger at the node. In one embodiment, the entire block is first written to the ledger with its transactions' valid/invalid flags. Then, the write sets of the valid transactions are committed to the state database.

Figures 2A, 2B:
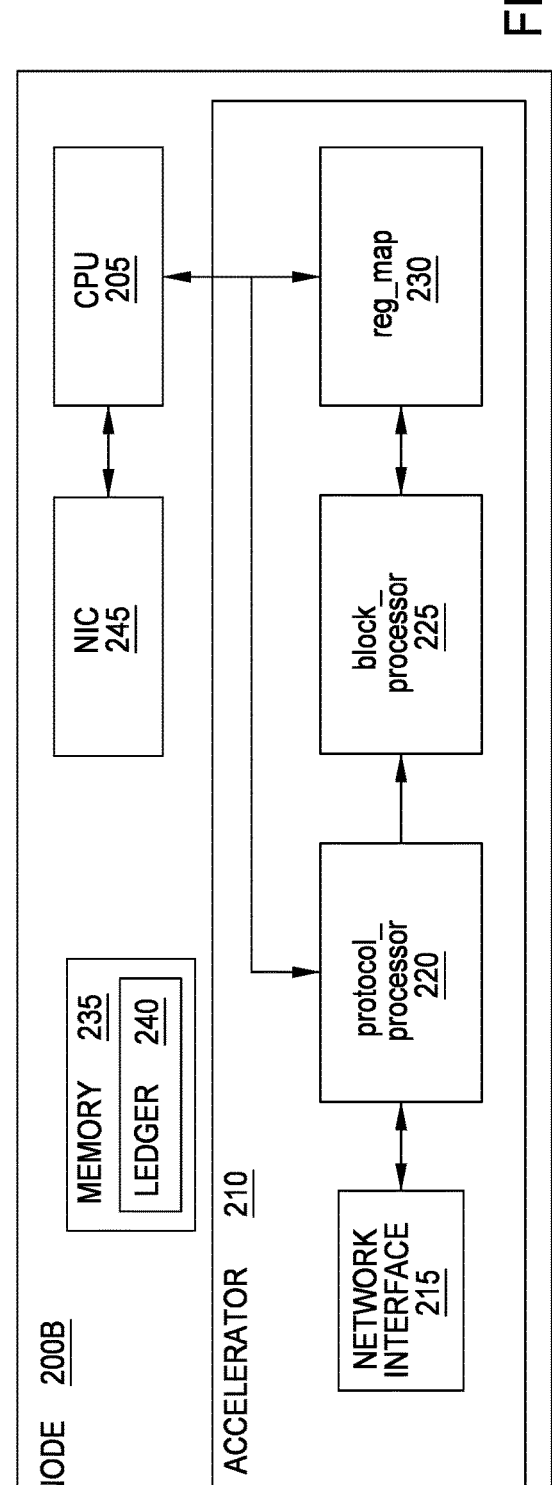
FIGS. 2A and 2B are block diagrams of nodes in a blockchain with a hardware accelerator, according to an example.

FIGS. 2A and 2B are block diagrams of nodes 200 in a blockchain with a hardware accelerator 210, according to an example. In one embodiment, the node 200 is any computing system that performs a validation process when committing transactions to a blockchain. For example, the node 200 may be an endorsing or non-endorsing node or peer as shown in FIG. 1. In one embodiment, the node 200 is a server or other computing system.

In FIG. 2A, the node 200A includes a CPU 205, the hardware accelerator 210, and memory 235. The CPU 205 represents any number of processors that each can contain any number of processing cores. The memory 235 represents volatile memory, non-volatile memory (e.g., a hard disk drive), and combinations thereof. As shown, the memory 235 stores a ledger 240 which lists the committed transactions of a blockchain.

The hardware accelerator 210 contains various circuit elements for performing the validation workflow 110 illustrated in FIG. 1. In one embodiment, the hardware accelerator 210 is an integrated circuit. In another embodiment, the hardware accelerator 210 is a board (e.g., a printed circuit board (PCB) such as a PCIe card) on which one or more integrated circuits are mounted. In one embodiment, the integrated circuit is a field programmable gate array (e.g., FPGA) or a system on a chip (SoC) that comprises programmable logic. In this example, the various circuit blocks in the accelerator 210 are implemented in programmable logic. However, in another embodiment, the integrated circuit may be an application specific integrated circuit (ASIC) where the circuit blocks of the accelerator 210 are implemented only in hardened circuitry. While using an FPGA and SoC with programmable logic gives the accelerator 210 the flexibility to be reprogrammed if the validation process is changed, using an ASIC may save space.

The accelerator 210 includes a network interface 215 for receiving Ethernet packets containing data regarding the transactions, a protocol processor 220 for reformatting the data so it can be consumed by downstream components, a block processor 225 for performing the validation workflow, and a register map 230 (reg_map) (e.g., memory registers) which store the results of the validation. In general, these hardware blocks work together to validate a received block of transactions. That is, the network interface 215 receives multiple packets which include data corresponding to a block of transactions. Because this data may be in a format that is unsuitable for processing, the protocol processor 220 can reformat and output the data for the block processor 225 for consumption. While the block processor 225 performs most of the steps in the validation workflow, some of these steps may be performed by the protocol processor 220 and the register map 230. Further, because the ledger 240 is stored in the memory 235 (which may not be directly accessible by the accelerator 210), the node 200A may rely on the CPU 205 to commit validated transactions to the ledger 240. That is, the accelerator 210 can store the validation results in the register map 230 which the CPU 205 can evaluate and then commit the transactions the ledger. That is, in one embodiment all the transactions are committed to the ledger but the validation flags store the information about which ones were valid and which were invalid. However, for the state database (which is discussed below), only successfully validated transactions are committed. While most of the validation is performed in the hardware accelerator 210, committing the transactions to the ledger 240 may be performed by software executing on the CPU 205.

FIG. 28 illustrates a node 200B that is the same as the node 200A in FIG. 2A except for the addition of a network interface card (NIC) 245. In one embodiment, the NIC 245 provides the node 200B with the ability to determine what network traffic flows through the accelerator 210 and what network traffic flows through the MC 245. In one embodiment, all traffic related to the blockchain may be sent through the accelerator 210 while received network traffic that is not related to the blockchain is processed by the NIC 245. In contrast, in node 200A all the network traffic received by the node 200A (whether blockchain or non-blockchain traffic) may be received at the accelerator 210. For example, the protocol processor 220 may forward the network traffic related to validation to the block processor 225 but forward all other traffic to the CPU 205.

In another embodiment, the accelerator 210 receives only the network traffic related to validating transactions at the accelerator 210 while all other traffic (whether it is other types of blockchain traffic such as an endorsement request, or non-blockchain traffic) is received and processed by the MC 245.

In yet another embodiment not shown in either FIG. 2A or 2B, the accelerator 210 may perform all blockchain operations without the aid of the CPU 205. In that embodiment, the MC 245 and the CPU 205 are not used to perform blockchain tasks, although the CPU 205 may be used to configure or control the accelerator 210. In this scenario, all network traffic goes through the accelerator 210 which processes the blockchain related packets but forwards other packets to/from the CPU 205.

Figure 3:
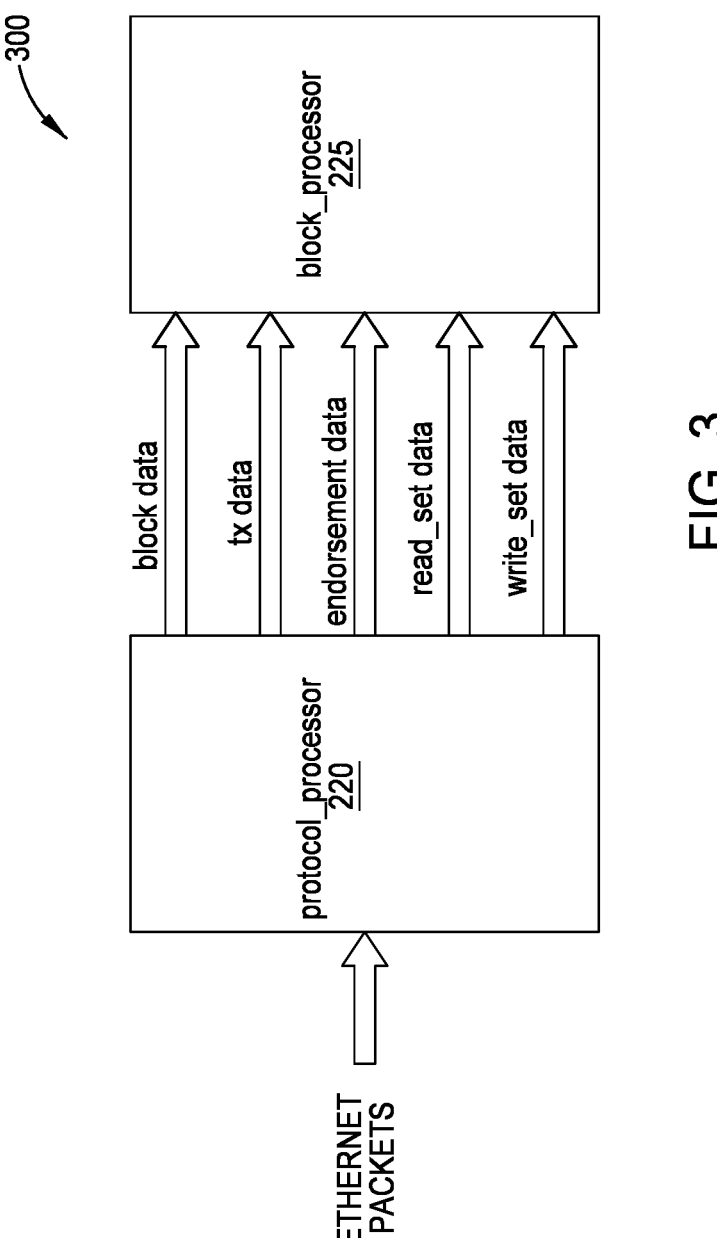
FIG. 3 illustrates an interface between a protocol processor and a block processor in the hardware accelerator, according to an example.

FIG. 3 illustrates an interface 300 between a protocol processor and block processor in the hardware accelerator, according to an example. In this example, the interface 300 is used to transmit block data, transaction data (labeled as tx data in FIG. 3), endorsement data, read set data, and write set data to the block processor 225. That is, the protocol processor 220 receives Ethernet packets from other nodes in the blockchain (e.g., from orderers in the ordering service) that contain the information used to validate a block of transactions. The protocol processor 220 then reformats/parses the data so that it can be consumed by the block processor 225.

Figure 4:
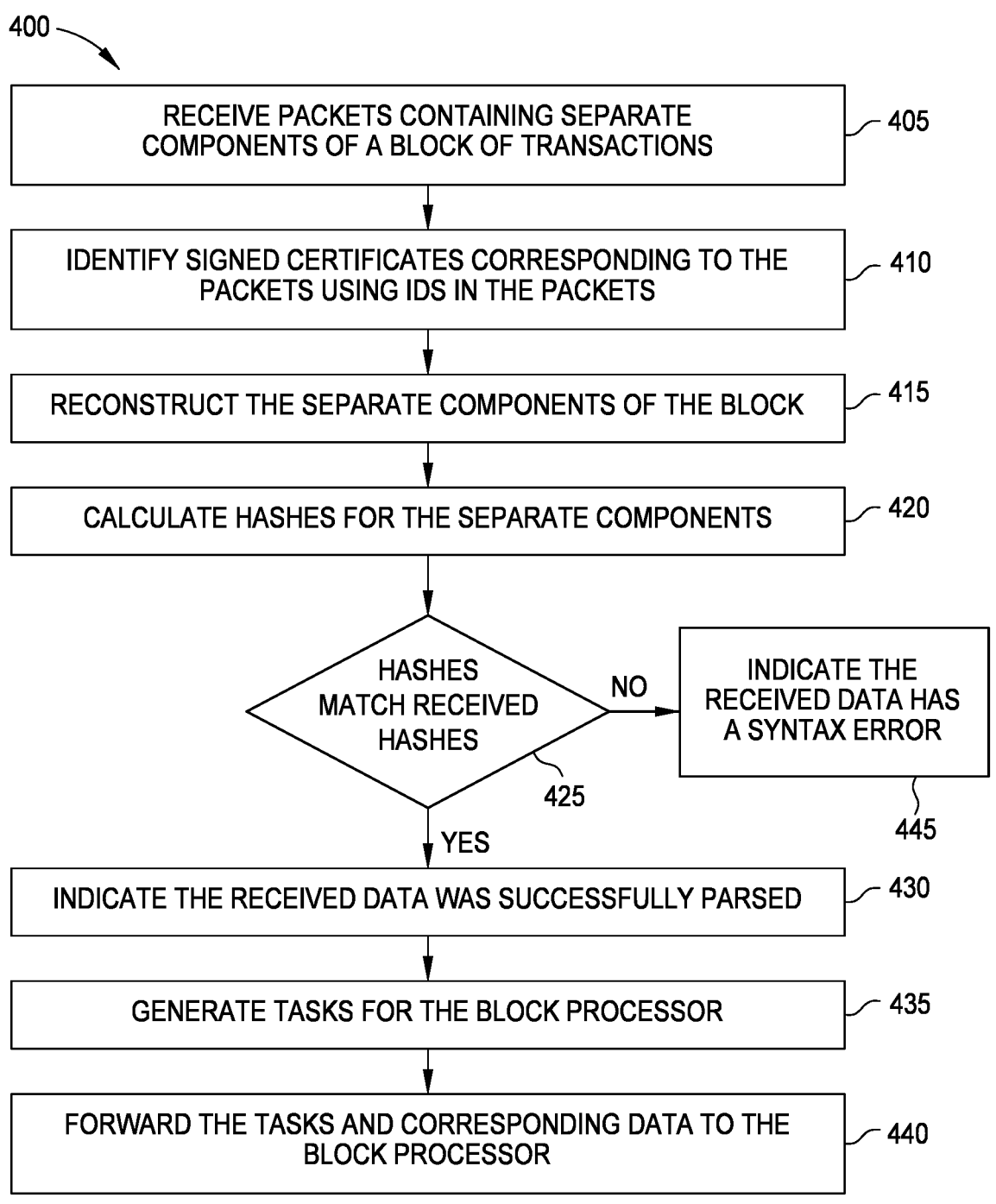
FIG. 4 is a flowchart for parsing packets to prepare data for hardware processing, according to an example.

FIG. 4 is a flowchart of a method 400 for parsing packets to prepare data for hardware processing, according to an example. For ease of explanation, the blocks in the method 400 are discussed in parallel with the Figures below.

At block 405, the network interface in the accelerator receives packets containing separate components of a block of transactions. Because the block is typically too large to send in a single packet (e.g., a block can be more than a megabyte), the software applications relies on the network protocol or a software driver to chunk the block into multiple packets. However, the network protocol/driver typically has no knowledge of how the data is structured in the block, and thus, data is typically transmitted in an ad hoc manner. This makes it difficult if not impossible for a hardware accelerator to then parse the received packets and reconstruct the block of transactions. However, the embodiments herein describe techniques for transmitting the block of transactions so that a hardware accelerator can parse the packets in order to reconstruct the different components in the block of transactions.

Figure 5A:
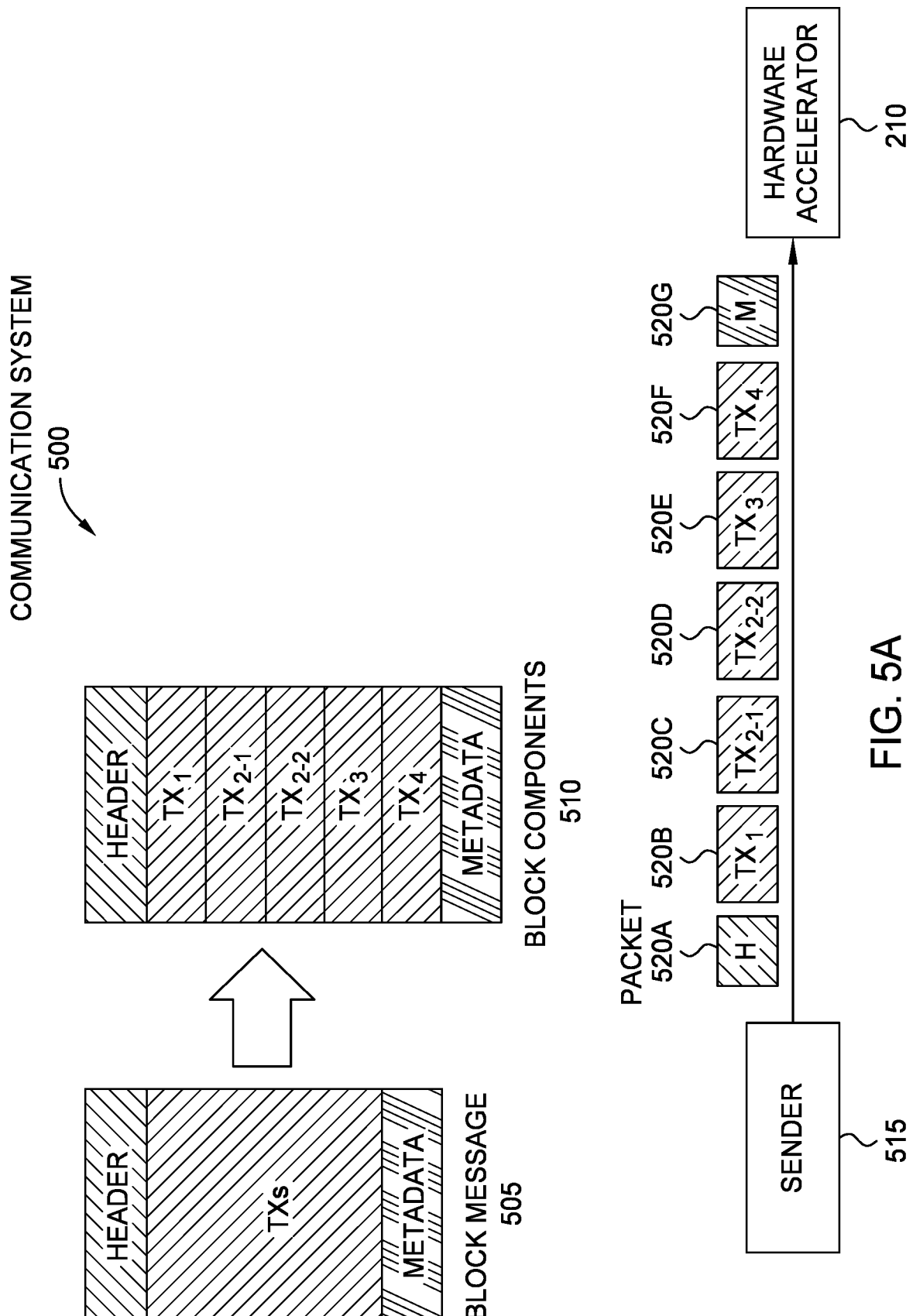
FIG. 5A illustrates transmitting separate packets for each component in a block of transactions, according to an example.

FIG. 5A illustrates transmitting separate packets for each component in a block 505 of transactions, according to an example. Specifically, FIG. 5A illustrates a communication system 500 where a sender 515 (e.g., an orderer or other peer node in the blockchain) transmits packets 520 to the hardware accelerator 210 so that these packets can be accurately parsed and the block message 505 can be reconstructed. To do so, software in the sender 515 divides the block message

505 into its separate block components 510 shown here as a header, transactions (TX) 1-4, and metadata. That is, rather than relying on a network protocol or driver to determine how to divide the data in the block message 505 into separate packets, the software on the sender 515 (which is aware of the structure of the block 505) can separate the block into its components 510. Further, a transaction may be too large for one packet. For example, Transaction 2 has been divided into two packets: $TX_{2-1}$ and $TX_{2-2}$.

FIG. 5A illustrates the sender 515 transmitting the packets 520A-520G to the hardware accelerator 210 over a network, e.g., a private or public network, such as the Internet. As shown, each packet 520 includes only one of the components 510 (or a sub portion of a transaction)—i.e., the packet 520A includes the header of the block 505, the packets 520B-520F each include information for at most one of the transactions (and packet 520C contains one portion of $TX_2$ while packet 520D contains the remaining portion), and the packet 520G includes the metadata of the block 505. Without the software dividing up the block 505 into its components 510, the network protocol or driver may have sent a first packet that included the header and a portion of $TX_1$, a second packet that included the remaining data of $TX_1$ and a portion of $TX_2$, and so forth. This unpredictable bifurcation of the different components 510 in the block 505 may make it difficult to design a hardware accelerator 210 to parse the data so the block 505 can be reconstructed. When a transaction is divided into multiple packets, sequence numbers can be used to track these packets to indicate their order. But in any case, any one packet contains information from only one transaction.

Also, while not shown in FIG. 5A, the sender 515 may remove signed certificates associated with the components 510. These certificates may be used to validate the block 505 and the transactions within the block. However, these certificates (e.g., x509 certificates) are large, which means transmitting them to the accelerator 210 requires a significant amount of bandwidth. In one embodiment, the sender 515 removes the certificates from the block 505 before forming the packets 520 that are then sent to the accelerator 210. Instead, the sender 515 can replace the certificates with an ID (e.g., an 8-bit code). In one embodiment, the sender 515 transmits the certificates separately to the accelerator 210 one time which can then store the certificates in a cache for later retrieval. In this manner, the certificates are sent once rather than repeatedly if they are associated with multiple components 510 in the block 505.

Figure 5B:
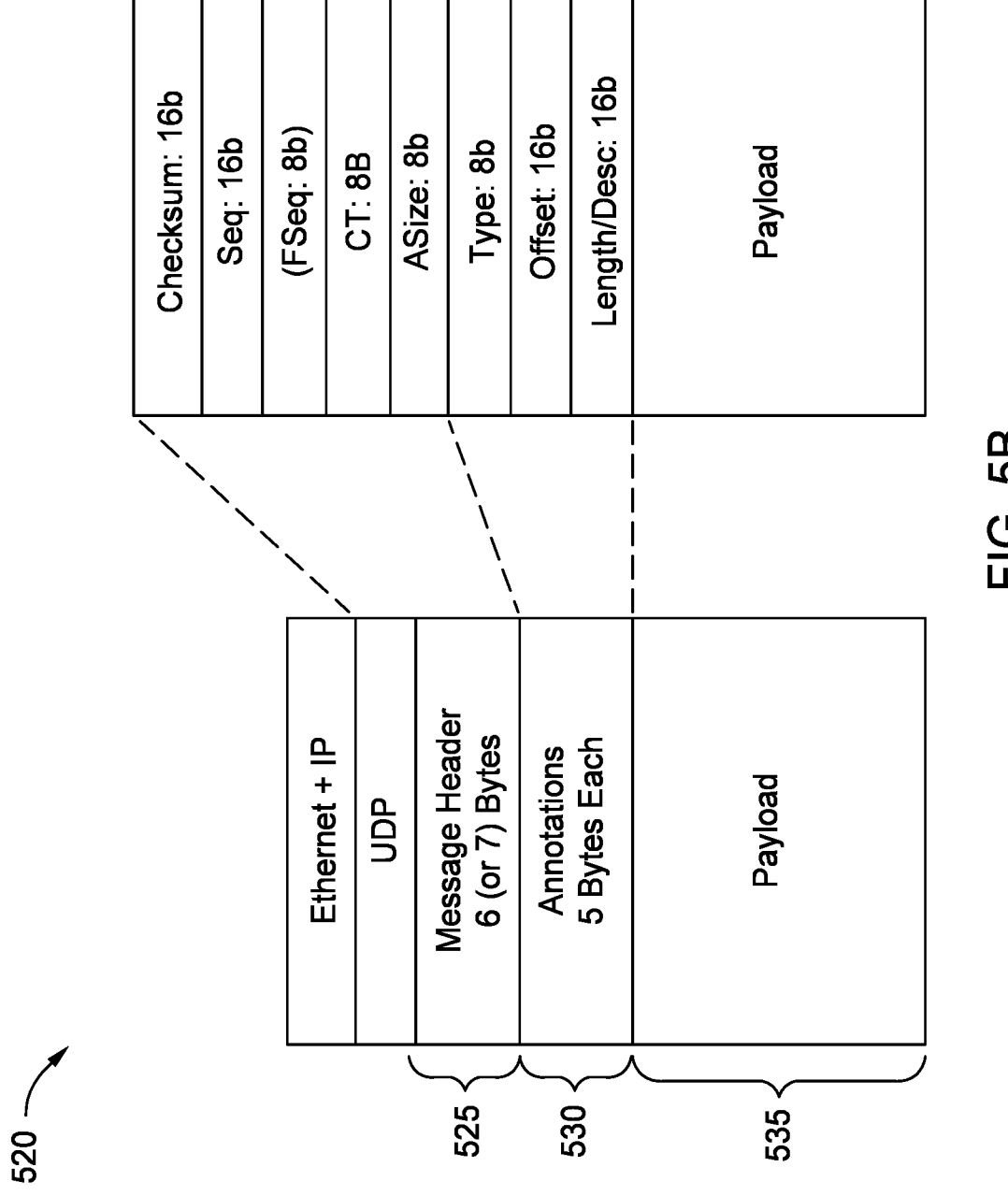
FIG. 5B illustrates a packet for sending an individual component in a block, according to an example.

FIG. 5B illustrates a packet 520 for sending an individual component in a block, according to an example. The 520 includes IP/UDP data, a message header 525, a block machine protocol header 530, and a block message payload 535. The message header 525 can be 6-7 bytes, but this can vary depending on the size of the information contained in the header 525. In this example, the message header 525 includes a checksum, sequence number (Seq), fragmentation sequence (FSeq), control type (CT), annotation size (ASize). The checksum can be used to ensure data integrity for the message header 525, the block machine protocol header 530, and the payload 535. In this embodiment, the checksum is 16 bits, but can be bigger or smaller depending on the type of checksum being used.

In one embodiment, the sequence number (Seq) includes a fragmentation status (e.g., 1 bit) that indicates whether the transaction is contained in one packet or multiple packets (e.g., $TX_2$ is sent using two packets). The sequence number can also include a block ID (e.g., 7 bits) that includes the current block number to which this transaction belongs.

Finally, the sequence number can include a transaction number of ID (e.g., 8 bits) that have the transaction number of the transaction contained in the packet 520.

The fragmentation sequence (FSeq) is used if the transaction has been divided into multiple packets (as indicated by the fragmentation status bit in the sequence number). In one embodiment, the fragmentation sequence (e.g., 8 or 16 bits) is an internal sequence for numbering the fragmented transaction. The fragmentation sequence enables the receiver to determine the order of the packets 520 used in the fragmented transaction.

The control type (CT) (e.g., 8 bits) can be used to control the speed of the sender. For example, the control type can include two bits used to indicate to the sender the buffer status of the receiver (e.g., b00 indicates the receiver's buffer is empty, b01 indicates the buffer is half full, b10 indicates the buffer is almost full, and b11 indicates the buffer is full). The control type can also include two bits for indicating a receiver transaction task FIFO status where, for example, b00 indicates the receiver FIFO is empty, b01 indicates the FIFO is half full, b10 indicates the FIFO is almost full, and b11 indicates the FIFO is full. In one embodiment, the control type includes a message type (e.g., 4 bits) used to indicate system acknowledgments, block message headers, block message transactions, block message metadata, and the like. The message type indicates whether the data in the payload 535 is a block header, a transaction, or metadata.

The annotation size (ASize) can indicate the number of annotations in the block machine protocol header 530 of the packet 520.

The block machine protocol header 530 can include annotations with information such as the type of the annotations, the offset, and the length and description. In one embodiment, the annotations point out the position of important data. For example, the annotations may include a pointer that points to relevant data in the packet 520 (e.g., where certain data in the payload 535 can be found) and a locator that points to data in a cache or in a different packet (but same block). In one embodiment, a locator in the annotations is used to mark the ID for the packet 520. The payload 535 can include the data corresponding to the particular component being sent in the packet i.e., metadata from the block 505.

Because each packet 520 contains one of the components 510 of the block 505, this provides the advantage that the accelerator 210 can begin to process the data before receiving all the packets 520 of the block. That is, instead of waiting for software to receive all the packets and then reconstruct the block 505 for validation, the accelerator 210 can process the transactions as they come in. For example, the protocol processor can parse the packet 520B corresponding to TX1 before the packet 520C containing TX2 is received at the accelerator 210. Thus, the accelerator 210 can begin to process the transactions much sooner than a software solution where all the packets must be received before the transactions can be reconstructed and validated.

Figure 6:
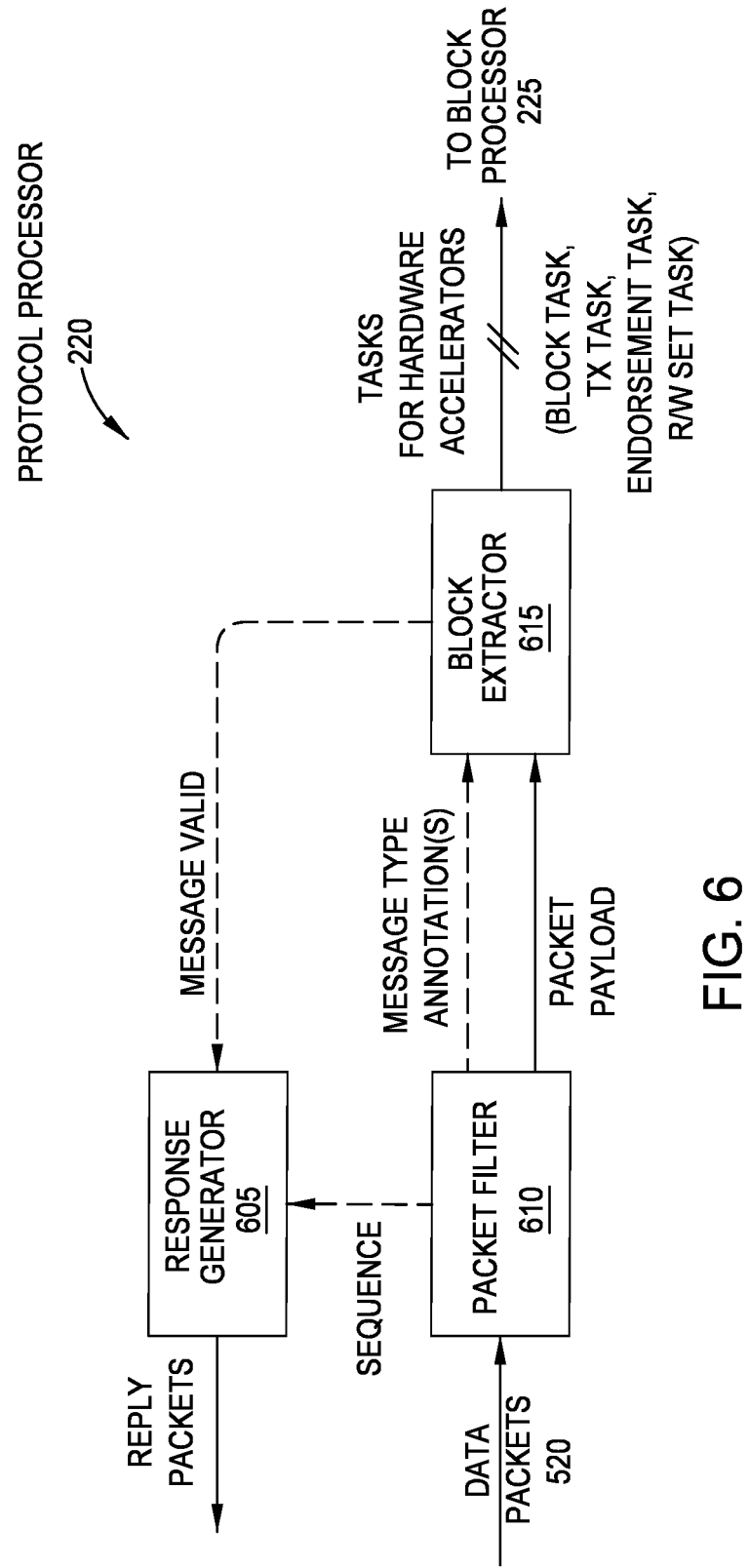
FIG. 6 is a block diagram of a protocol processor in a hardware accelerator, according to an example.

FIG. 6 is a block diagram of the protocol processor 220 in the hardware accelerator, according to an example. As shown, the data packets 520 are received at a packet filter 610 that parses the Levels 4-7 (L4-L7) packet headers (e.g., the block machine protocol header 530) to extract the message type and the annotations. The message type may include the block start, the block metadata, transaction, etc. The annotations for the message payload can include position of the block header, the location of the block signatures, block ID, transaction data start, channel name, transaction ID, chaincode name, creator certificate authority (CA) ID, transaction action, transaction CA ID, contract name, contract input, endorser action, read write set, endorser list, transaction signature, orderer CA ID, orderer signature, certificate ID, certificate public key data, state valid since information, state valid through information, and the like. The packet filter 610 also identifies the sequence number in the transport header and forwards this number to a response generator 605 which transmits response packets (e.g., an acknowledgement packet) back to the sender (e.g., the orderer).

The packet filter 610 forwards the message type, annotations, and packet payload to a block extractor 615 which processes the message payload based on the annotations and extracts relevant data for the block processor 225. The block extractor 615 also provides a message valid signal for the response generator 605 so the generator 605 can inform the sender whether the block and its transactions are valid or invalid. The details of the block processor 225 are discussed in the remaining portions of the method 400 and the figures below.

Returning to the method 400, at block 410 the block extractor in the protocol processor identifies signed certificates corresponding to the packets using Ds in the packets. As mentioned above, the sender may strip the certificates from the block before transmitting the block in a plurality of packets to the hardware accelerator. This may be done since the certificates are large, and rarely change. Thus, replacing the certificates with a much smaller ID or key in the packets that refer to the certificates may save significant bandwidth and ensure that each component in the block of transactions can be sent in a single packet.

Once the packets are received, however, the block extractor may need the certificates in order to validate the block (and the transactions in the block) and to ensure the syntax of the block and transaction is correct. Thus, the block extractor may reconstruct the components, which means the block extractor identifies and retrieves the certificates.

Figure 7:
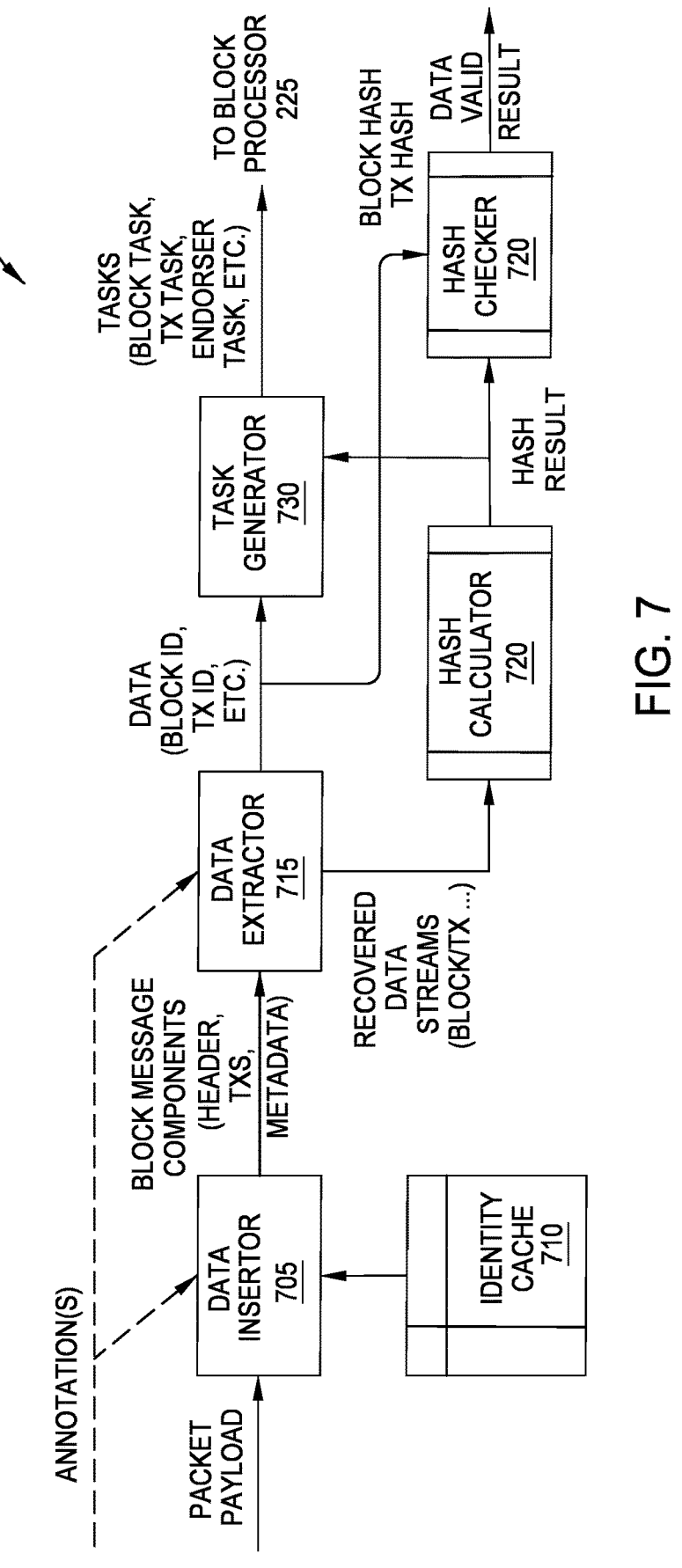
FIG. 7 is a block diagram of a block extractor in a protocol processor, according to an example.

FIG. 7 is a block diagram of the block extractor 615, according to an example. As shown, the block extractor 615 includes a data insertor 705 that receives the packet payload and the annotations to identify the certificate (or certificates) corresponding to that payload. For example, if the payload is block metadata, the payload may include an ID corresponding to a certificate of the orderer that prepared the block. If the payload includes a transaction, the payload may include an ID corresponding to the client that submitted the transaction and one or more IDs corresponding to endorsing nodes that endorsed the transaction. Thus, the data insertor 705 may identify multiple IDs in the payload.

Using the IDs, the data insertor 705 performs a lookup in an identity cache 710 to retrieve the signed certificates corresponding to the IDs. That is, when an orderer sends certificates to the accelerator, the accelerator stores those certificates (and their corresponding IDs) in the identity cache 710 so that these certificates can then be retrieved when validating a block of transactions.

Returning to the method 400, at block 415 the block extractor 615 reconstructs the separate components of the block. That is, as each payload is received, the block extractor 615 can retrieve the corresponding certificate. This is shown in FIG. 7 where the data insertor 705 transmits the retrieved certificate (or certificates) along with the other data in the payload to a data extractor 715.

The data extractor 715 may reconstruct the components in the block of transactions at different times. For example, during Time 1, the data extractor 715 reconstructs the header of the block using a first received packet, at Time 2, the data extractor 715 reconstructs the first transaction in the block using a second received packet, and so forth. Thus, the block extractor 615 can be pipelined so that different components in the block can be executing at different stages (e.g., different circuit modules) in the extractor 615 in parallel.

At block 420, a hash calculator 720 calculates hashes for the separator components in the block. In one embodiment, the hash calculator 720 generates a hash for the entire block, every transaction of the block, and every endorsement of each transaction. The hash calculator 720 may generate these hashes at different times. For example, the hash calculator 720 can generate a hash for a particular transaction (and hashes for all the endorsements associated with that transaction) when it receives a packet corresponding to the transaction. However, the hash calculator 720 may wait to calculate a hash for the entire block after it has received all the packets for the block.

At block 425, a hash checker 725 determines whether the hashes calculated by the hash calculator 720 match hashes in the packets. That is, the packets transmitted by the sender may contain previously calculated hashes (or at least pointers to hashes) that can be compared to the hashes generated by the hash calculator 720. For example, the sender may calculate hashes for the block, each transaction in the block, and each endorsement in the transactions and transmit those hashes to the accelerator 210. If those hashes match the local hashes generated by the hash checker 725, this means the messages are valid and the proper syntax for the block and transactions has been followed. If the hashes do not match, the method proceeds to block 445 where the hardware accelerator indicates the received data has a syntax error. In one embodiment, the hardware accelerator sends a reply message to the sender indicated the validation process has failed.

Assuming the hashes do match the received hashes, the method 400 proceeds to block 430 where the hardware accelerator indicates the received data was successfully parsed. In one embodiment, the response generator 605 in FIG. 6 transmits a reply or acknowledge (ACK) message to the sender indicating the block of transactions has been successfully received and processed by the protocol processor 220.

At block 435, a task generator 730 generates tasks for the block processor in order to complete the validation process. In one embodiment, the task generator 730 generates block tasks, transaction tasks, and endorser tasks. The block tasks may include a block ID, block signature (e.g., the certificate of the orderer that generated the block), etc. The transaction tasks may include a transaction ID, transaction signature (e.g., the certificate of the client that generated the transaction), transaction read/write sets, etc. In one embodiment, the task generator 730 generates a transaction task for each transaction in the block. The task generator 730 can also generate an endorser task for each endorsement in a transaction. That is, because each transaction can receive several endorsements, the task generator 730 may generate a task for each of those endorsements.

At block 440, the task generator 730 forwards the tasks and corresponding data to the block processor in the hardware accelerator. The block processor can then validate the block, transactions, and the endorsements. In general, the protocol processor (and its circuit components illustrated in FIGS. 5-7) parses the received packets to reformat the data of the block into a format that can be digested or processed by the block processor without the help of software. Thus, the validation process in a blockchain can be performed entirely by hardware, thereby reducing the time and compute resources needed for this process.

Figure 8:
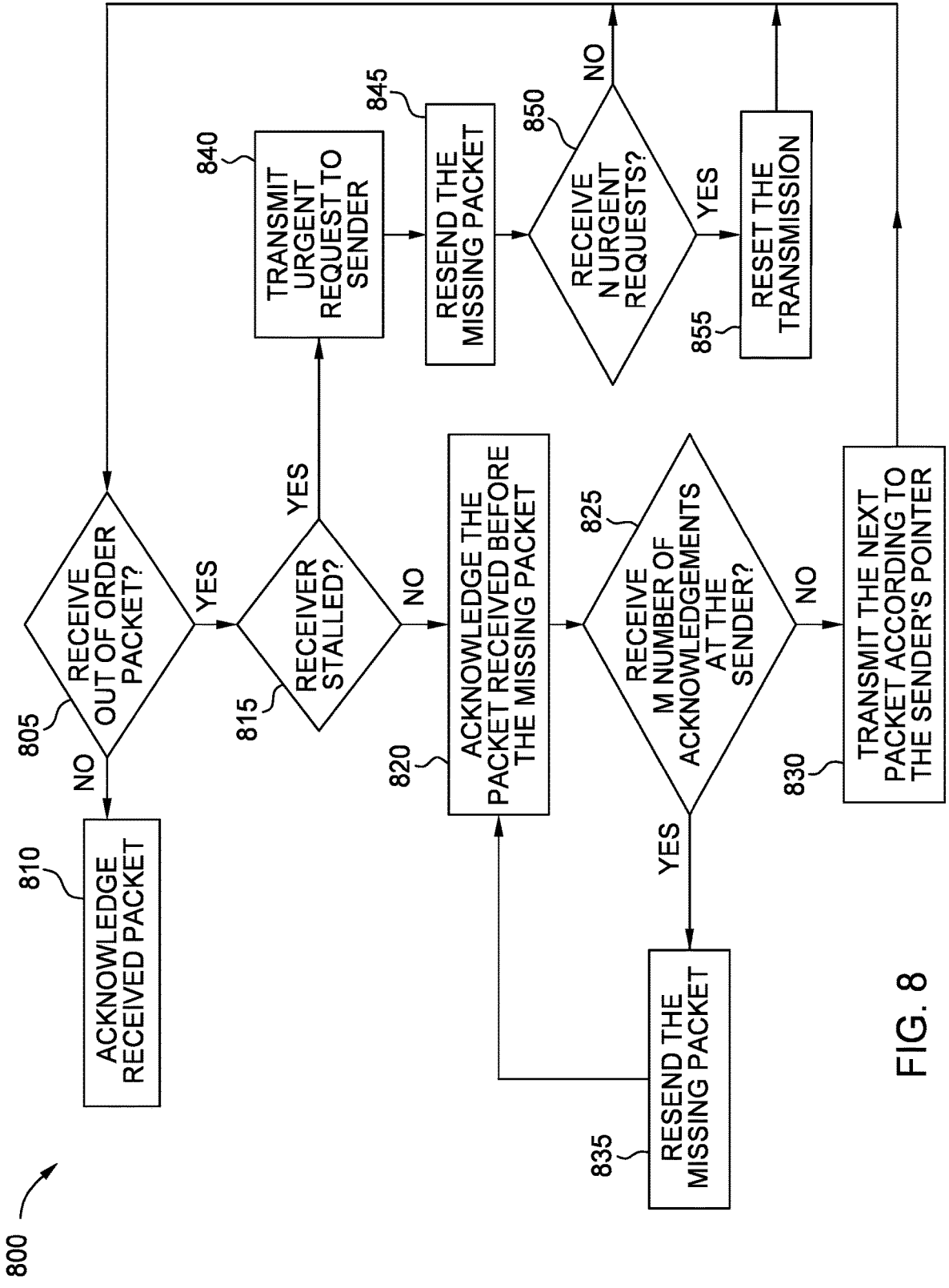
FIG. 8 is a flowchart for performing loss prevention and recovery, according to an example.

FIG. 8 is a flowchart of a method 800 for performing loss prevention and recovery, according to an example. Some of the blocks in the method 800 are discussed in tandem with FIGS. 9-13 which illustrate different transmission scenarios. The method 800 can be used in the communication system 500 in FIG. 5A where a single sender 515 sends multiple packets 520 corresponding to transactions in a block message 505 to a hardware accelerator 210, Further, the method 800 can be used in a communication system where multiple senders send the same block message (containing the same transactions) to the hardware accelerator. That is, the blockchain system may use a gossip protocol where multiple senders transmit the same block message to the hardware accelerator.

At block 805, the receiver (e.g., the hardware accelerator) receives a packet from the sender (e.g., a node in the blockchain) and determines whether the packet is out of order. For example, using the sequence number (Seq) shown in FIG. 5B, the receiver can determine whether the packet for Transaction 2 of the block message was received before the packet for Transaction 1 of the block message. Or the receiver can use the fragmented sequence (FSeq) to determine whether the second packet for Transaction 2 was received before the first packet for Transaction 2.

If the receiver determines the received packet is in order (I.e., has a later sequence number than the previously received packets), the method proceeds to block 810 where the receiver acknowledges the received packet, indicating to the sender that the packet was received in order at the receiver.

Figure 9:
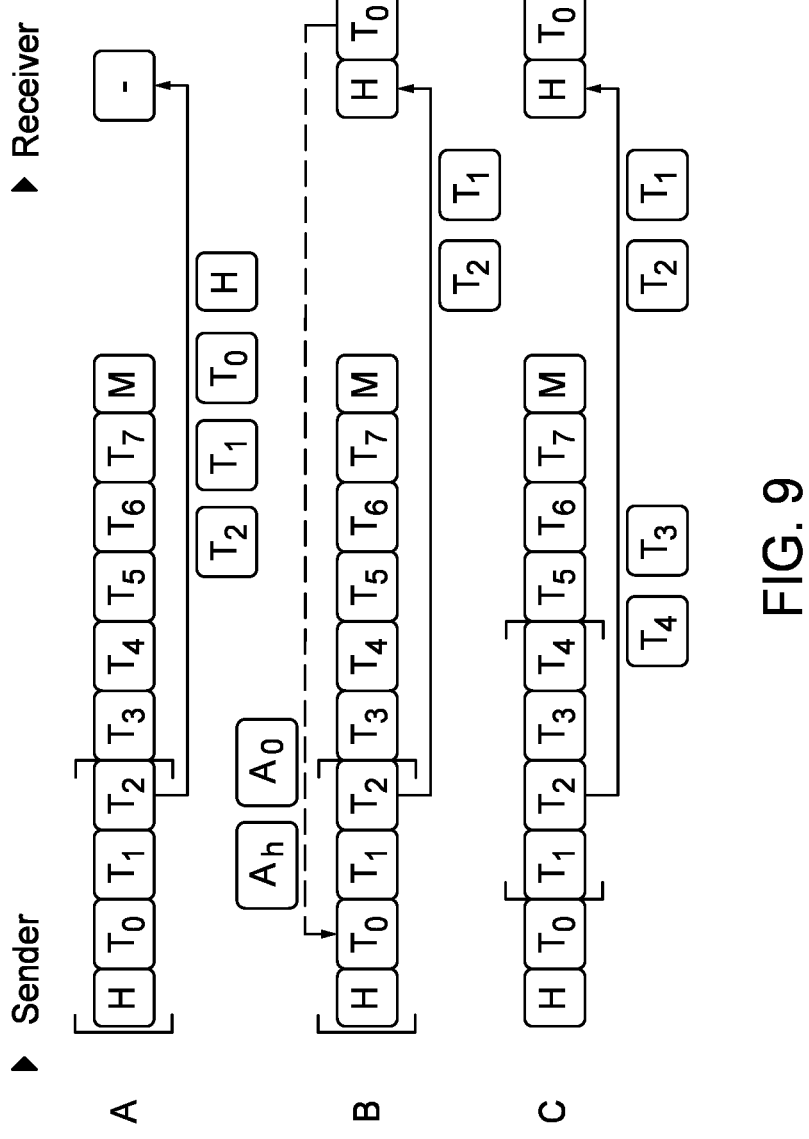
FIG. 9 illustrates a normal scenario, according to an example.

FIG. 9 illustrates a normal scenario where the receiver receives packets from a sender in order. FIG. 9 illustrates three time periods (Times A, B, and C). At Time A, there are four packets in transit to the receiver that are defined by a first sending window (illustrated by the brackets). That is, the sender has sent the packet for the header (H) of the block message and packets for the Transactions 0-2 ($T_0$, $T_1$, and $T_2$), but these packets have not yet been received at the receiver.

At Time B, the receiver has received the packets for the header and Transaction 0. Because both of these packets were received in order (first the packet for the header and then the packet for Transaction 0), the sender sends two acknowledgements to the sender—i.e., an acknowledgement for the header and an acknowledgement for Transaction 0.

At Time C, based on receiving the acknowledgements, the sender shifts the timing window and transmits packets for Transactions 3 and 4 to the receiver. That is, because the sender has already sent the packets for Transactions 1 and 2, when shifting the sending window, the sender determines it should send packets for Transactions 3 and 4. When the sender receives acknowledgements for the Transactions 1 and 2, it can again shift the sending window to send out packets for Transactions 5 and 6.

Returning to FIG. 8, if the received packet is out of order, the method 800 proceeds to block 815. The remaining blocks in the method 800 describe different loss prevention and loss recovery techniques performed by the receiver and the sender when there is an out of order packet.

At block 815, the receiver determines whether it is stalled waiting for the previous packet. That is, method 800 assumes the receiver processes the packets in order. If the next packet is not yet available (e.g., the receiver cannot process any packets because it is still waiting on a packet), then the receiver is stalled. However, assuming the buffer still has received, in-order packets in its buffer when it receives the out of order packet, the method 800 proceeds to block 820.

Figure 10:
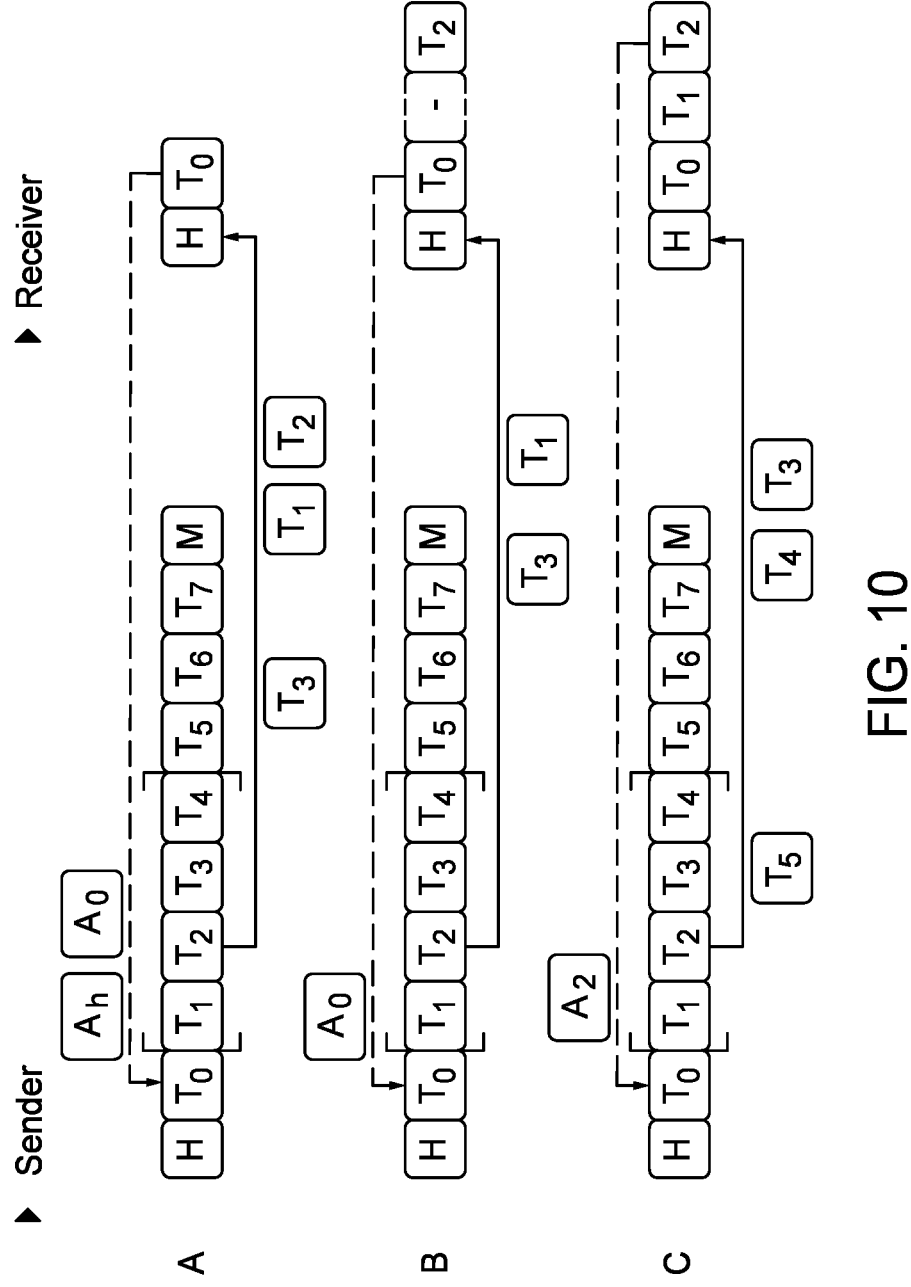
FIGS. 10-12 illustrate loss prevention scenarios, according to examples.

At block 820, the receiver acknowledges the packet received before the missing packet. FIG. 10 illustrates a loss prevention scenario where the receiver acknowledges the packet before the received packet. As shown, at Time A, the receiver has received the packets for the header and Transaction 0 and has sent corresponding acknowledgements to the sender. However, due to network conditions, the next packet to be received by the receiver will be the packet for Transaction 2, instead of the packet for Transaction 1. Thus, at Time B, the buffer for the receiver stores the packets for the header, Transaction 0 and Transaction 2. The receiver realizes (e.g., at block 805) that it received an out of order packet (i.e., the packet for the Transaction 2). Further, the receiver has not stalled since its buffer still has the packet for the header and Transaction 0 that can be processed. Thus, at Time B, the receiver transmits a second acknowledgement for Transaction 0 to the sender (and does not send an acknowledgement for Transaction 2).

This acknowledgement indicates to the sender that the receiver has received a packet for a later transaction without first receiving the packet for Transaction 1 (i.e., the packet for Transaction 1 is missing). However, at Time C, receiving the second acknowledgement for Transaction 0 does not cause the sender to re-transmit the packet for Transaction 1 (i.e., the missing packet). That is, although the second acknowledgement for Transaction 0 informs the sender that the receiver has not yet received the packet for Transaction 1, the sender proceeds with sending the next packet that has not been sent already—i.e., the packet for Transaction 5. In this embodiment, the sender waits until receiving M number of acknowledgments associated with a missing packet before re-transmitting the missing packet. For example, assume M is 3. In FIG. 10, the sender has received only two acknowledgements for Transaction 0, and thus, continues with sending the next packet (Transaction 5). Using M as a predefined setting (or delay) to prevent the sender from immediately re-sending a missing packet can account for the situation in FIG. 10 where the missing packet is not lost on the network but is merely delayed. At Time C, the receiver receives the packet for Transaction 1 without the sender having to resend the packet. In response, the receiver then acknowledges the receipt of Transaction 2 to the sender, which informs the sender that the packets for both Transactions 1 and 2 have been received.

Thus, FIG. 10 illustrates a loss prevention technique where out of order packets can be received at the receiver but does not require the sender to immediately re-send the missing packet.

Returning to FIG. 8, at block 825, the sender determines whether it has received M number of acknowledgements corresponding to a missing packet. In the scenario in FIG. 10: the sender received less than M number of acknowledgements corresponding to the missing packet for Transaction 1. As such, the method 800 proceeds to block 830 where the sender transmits the next packet according to its pointer (which in FIG. 10 was the packet for Transaction 5 since it was next in line to be transmitted to the receiver). Put differently, the sender does not yet act on the missing packet. The method 800 then returns to block 805 to determine if the next packet received is out of order.

Figure 11:
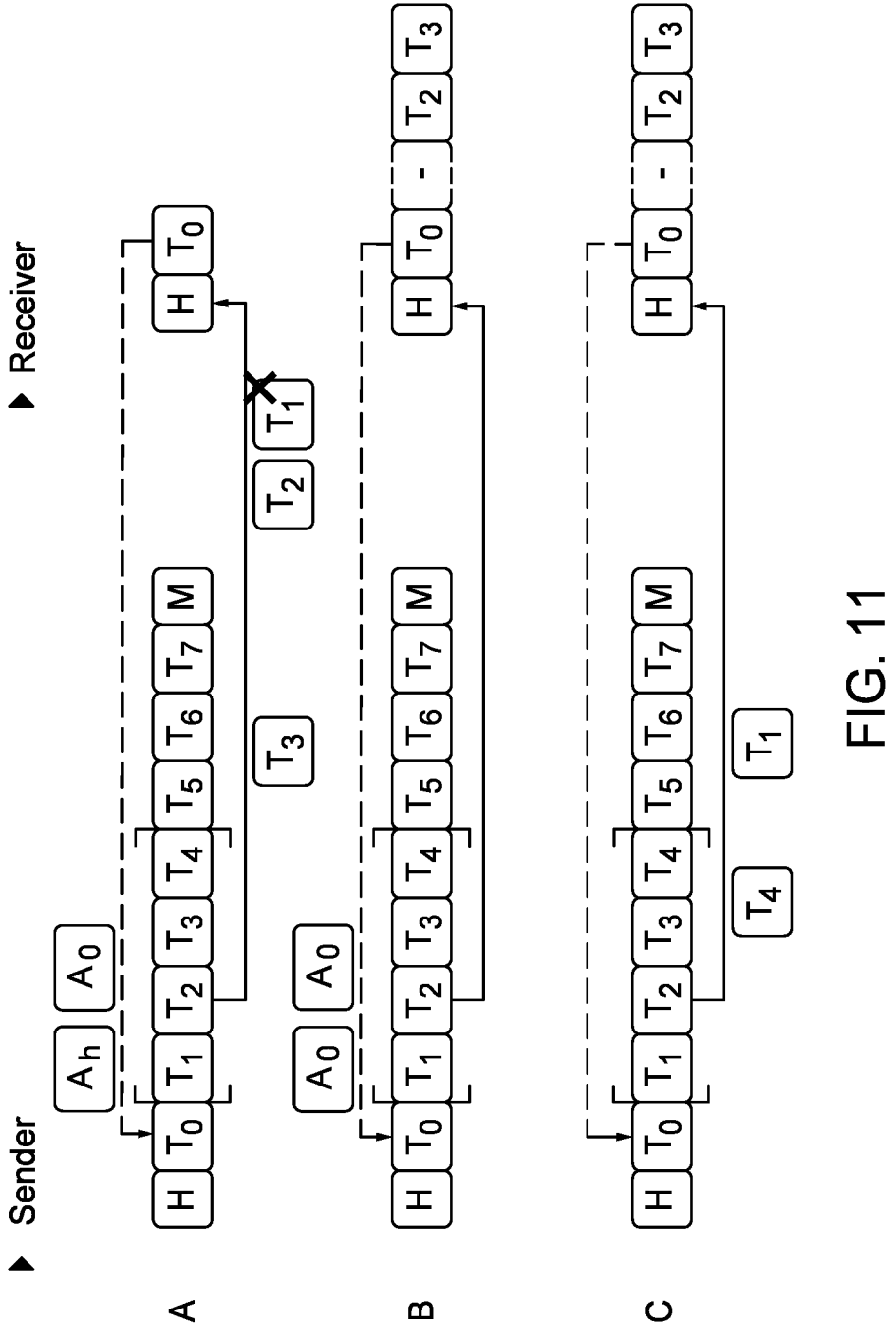

In contrast, FIG. 11 illustrates a scenario where the sender receives M number of acknowledgements corresponding to a missing packet. In this scenario, the packet for Transaction 1 is lost at Time A as represented by the "X". Thus, at Time B, the receiver received two out of order packets—i.e., the packets for Transactions 2 and 3—and in response sent two additional acknowledgements for the packet before the missing packet (i.e., Transaction 0) to the sender. In total, at Time B the sender has received three acknowledgements for Transaction 0.

Because M is three in this example, receiving the third acknowledgement for Transaction 0 prompts the sender to resend the missing packet at block 835 of the method 800. That is, instead of sending the next sequential packet, the sender resends the missing packet for Transaction 1 to the receiver. Moreover, the sender can then return to sending the next sequential packet (i.e., the packet for Transaction 4). That is, in this embodiment, the receiver resends the missing packet without then resetting and sending all the packets it has already sent after the missing packet (i.e., the packets for Transactions 2 and 3). Thus, FIG. 11 illustrates an example of block 835 in the method 800 where the sender resends the missing packet after receiving M number of acknowledgements corresponding to the packet prior to the missing packet (e.g., the three acknowledgements for Transaction 0). The method can then return to block 805 to evaluate the next packet.

Returning to block 815 of the method 800, if the receiver is stalled waiting on the missing packet, the method 800 instead proceeds to block 840 where the receiver transmits an urgent request to the sender for the missing packet. That is, in contrast to block 820 where the receiver acknowledges the packet before the missing packet to inform the sender of a missing packet, at block 840 the receiver transmits an urgent request asking the sender to, at block 845, resend the missing packet immediately.

Figure 12:
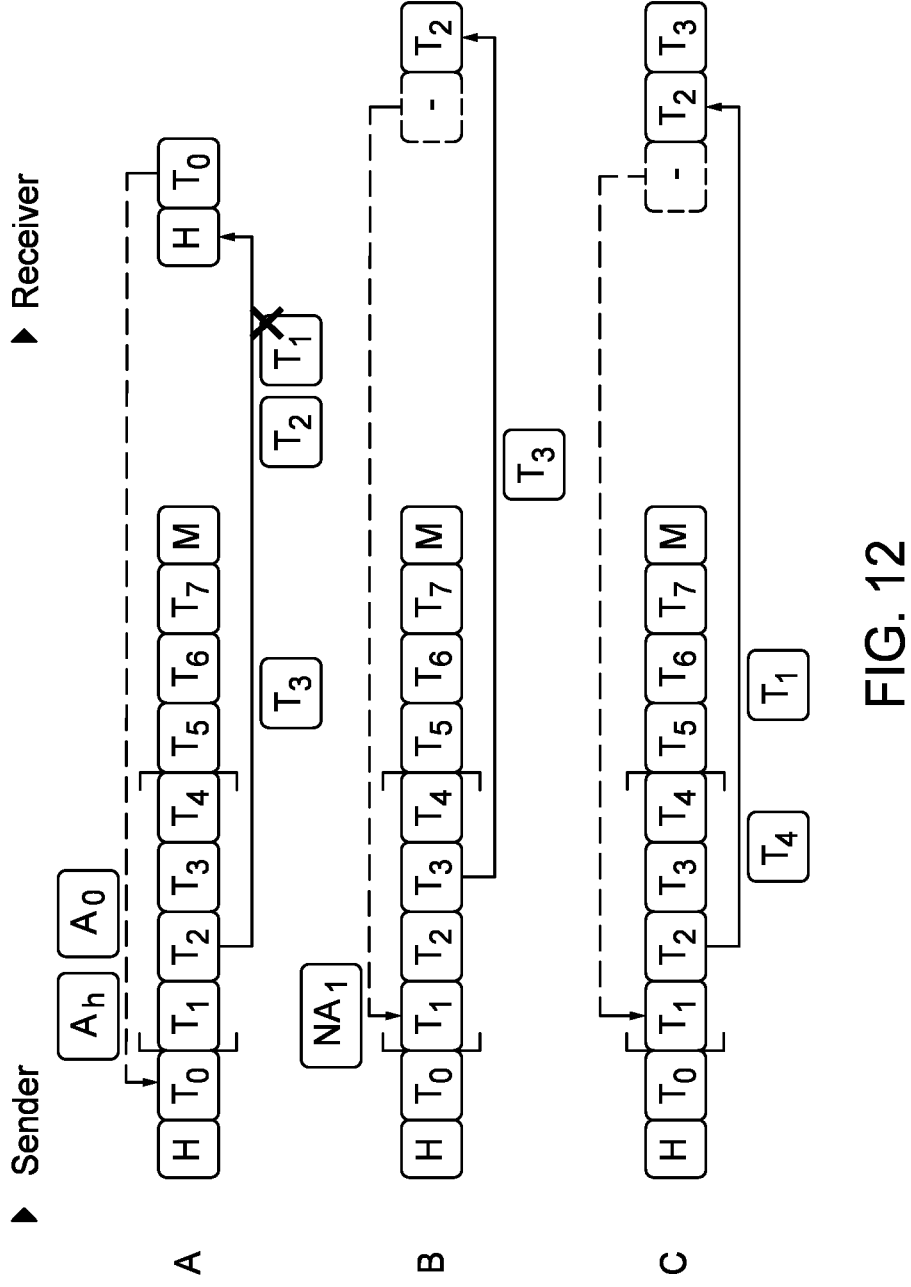

FIG. 12 illustrates a loss prevention scenario where the receiver is stalled waiting on a missing packet. As shown at Time A, the receiver has received and acknowledged the packets for the header and Transaction 0. However, the packet for Transaction 1 has been lost in the network.

At Time B, the receiver receives the packet for Transaction 2 and determines it is an out of order packet since the receiver has not received the packet for Transaction 1. Moreover, the receiver determines that it does not have any unprocessed packets in its buffer. That is, the receiver has already processed the packets for the header and Transaction 0 and is stalled waiting on the packet for Transaction 1. As discussed above, the receiver cannot process the packet for Transaction 2 until first processing Transaction 1. For example, different transactions in a blockchain may be dependent on each other. For example, Transaction 1 and 2 may affect the same bank account or the transfer of the same asset. Thus, they should be processed in the order they occurred so the transactions can be validated (or invalidated). For example, Transactions 1 and 2 may both transfer X monies from an account when that account only has X monies in it. Transaction 1 will be valid while Transaction 2 should be invalidated. This occurs only if the receiver processes the transactions in their correct order.

After determining the buffer is empty and the receiver is stalled, the receiver sends an urgent message (NA or NAK) indicating to the sender that the receiver needs the missing packet immediately. That is, the NA can tell the sender that the receiver needs the packet for Transaction 1 immediately.

At Time C, the sender resends the packet for Transaction 1 and then continues to send the next sequential packet—i.e., the packet for Transaction 4. That is, in this embodiment, the receiver resends the missing packet without then resetting and sending all the packets it has already sent after the missing packet (i.e., the packets for Transactions 2 and 3).

The sender in FIG. 12 does not reset and resend any additional packets except for the missing packet in response to the urgent message. In one embodiment, the receiver counts the number of urgent requests it gets for a missing packet. For example, the receiver may wait until receiving N number of urgent requests before it resets and resends the missing packets as well as the following packets that have been sent to the receiver. This logic is illustrated at block 850 of the method 800 where if the sender has received less than N number of urgent requests for the same missing packet, the method 800 returns to block 805 without the sender resetting its transmission. However, if the sender has received N number of urgent requests, the method 800 proceeds to block 855 where the sender resets its transmission to the receiver.

Figure 13:
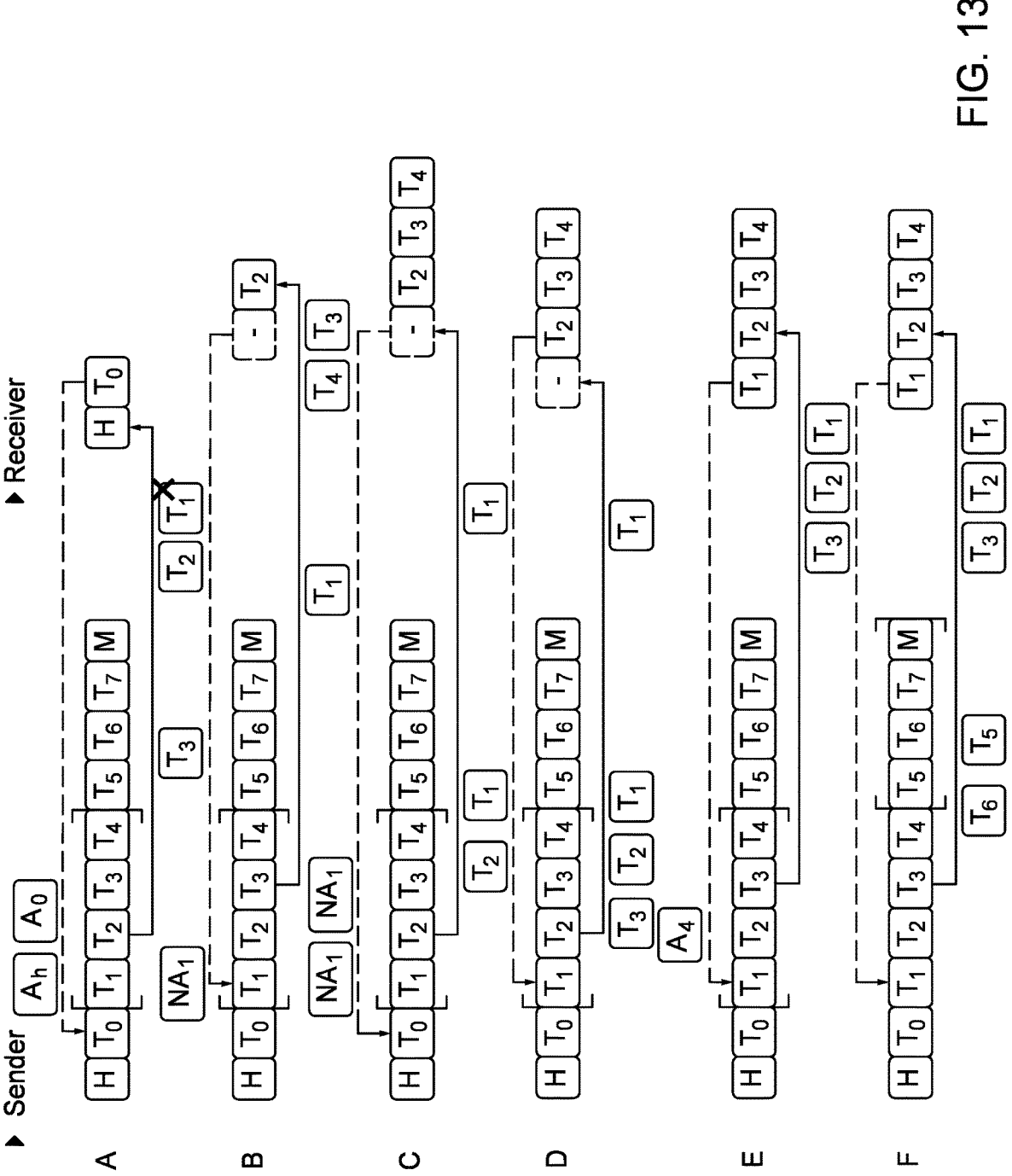
FIG. 13 illustrates a loss recovery scenario, according to an example.

FIG. 13 illustrates a scenario where the sender resets its transmission. Time A in FIG. 13 is the same as Time A in FIG. 12 where the receiver has received, acknowledged, and processed the packets for the header and Transaction 0. After receiving the urgent request (NA) regarding the missing packet, the sender resends the missing packet for Transaction 1 without resetting. However, before receiving the urgent request, the sender has already sent the packet for Transactions 3 and 4 to the receiver.

At Time C, the receiver sends two additional urgent requests regarding the missing packet in response to receiving the packets for Transactions 3 and 4. In response, the sender sends two copies of the missing packet for Transaction 1. Further, it is assumed that N is three. Thus, after receiving the third urgent request for Transaction 1, the sender resets its pointer and resends the packets that it has already transmitted. That is, in response to the third urgent request, the sender resends the packet for Transaction 1 and then sends the packet for Transaction 2, despite this packet being sent previously. In this case, the sender does not know if the receiver received the packets subsequent to the missing packet (i.e., the packets for Transactions 2, 3, and 4).

Time Q illustrates the receiver sending the packet for Transaction 3. At Time E, the receiver receives the missing packet for Transaction 1. However, instead of acknowledging this packet, the receiver instead acknowledges the latest packet it received—i.e., the packet for Transaction 4. Thus, when the sender receives this acknowledgement, it knows the sender has received the missing packet, and has already received packets for Transactions 2-4. In response, at Time F, the sender resets its sending window to transmit the next packet—i.e., the packet for Transaction 5—to the sender. Thus, the acknowledgement informs the sender of the next packet needed by the receiver which enables the sender to skip over resending the packet for Transaction 4. If the acknowledgement would have come before the sender resent the packets for Transactions 2 and 3, the sender could have skipped resending those packets as well.

In this manner, the method 800 in FIG. 8 and the scenarios in FIGS. 9-13 indicate different techniques a receiver and sender can perform to mitigate the loss of a packet in a system where the packets are processed in order (such as the blockchain system described above).

Figure 14:
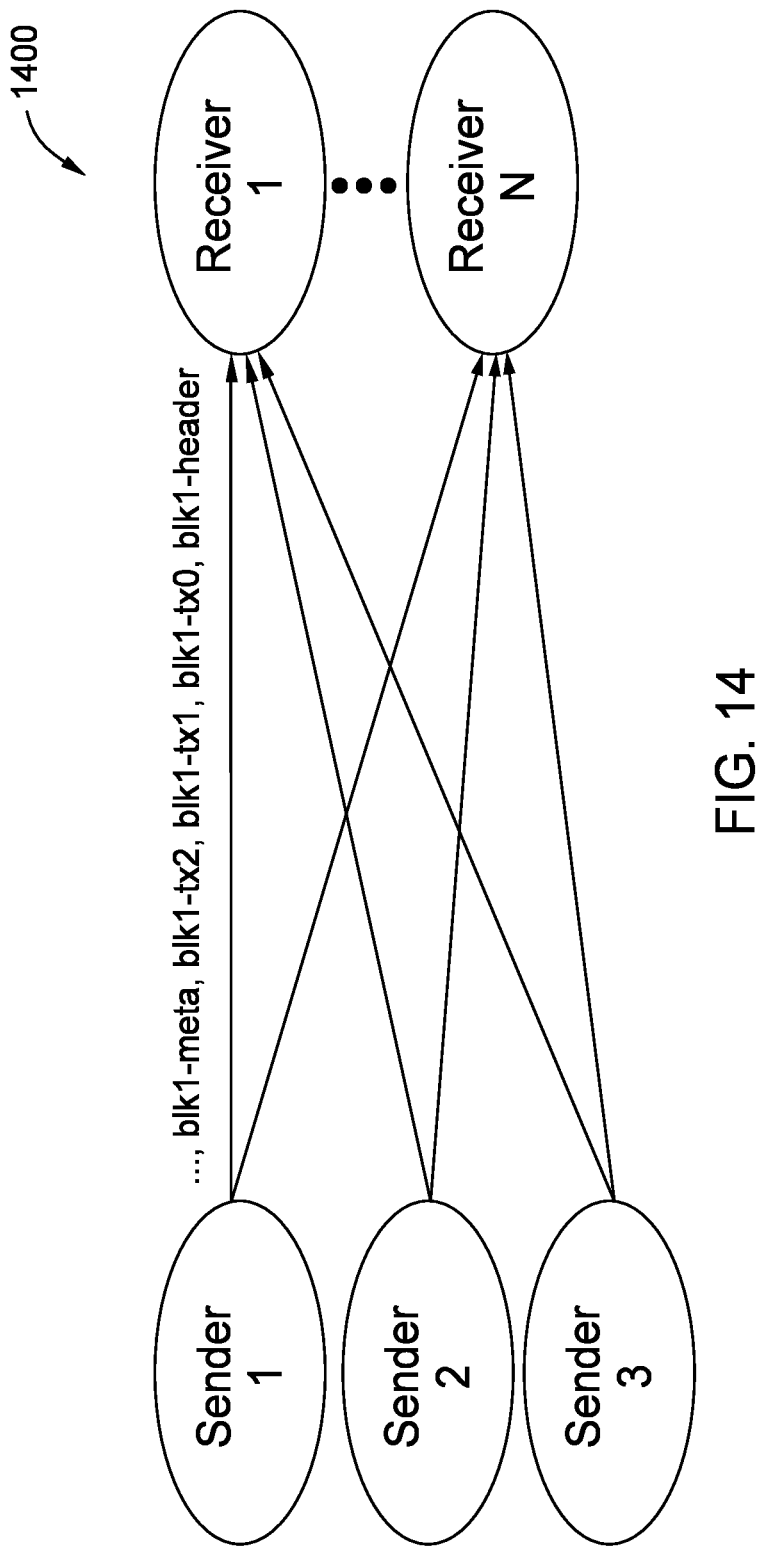
FIG. 14 illustrates a multi-sender/receiver system, according to an example.

FIG. 14 illustrates a multi-sender/receiver system 1400, according to an example. Some blockchain systems, such as the systems discussed above, can use a multi-sender/receiver system 1400 as shown in FIG. 14. In this case, multiple senders (e.g., multiple blockchain nodes) can send the same block messages to multiple receivers (e.g., the hardware accelerators). That is, the Receivers 1 and N receive the same block messages from multiple senders. These block messages can be formatted into packets containing transactions as shown in FIGS. 5A and 5B.

However, the packets may be received at different times at the receivers. For example, due to processing speeds in the senders and network connections, the Receiver 1 may receive the same packets at different times from the senders. As discussed below, this information can be used to perform loss prevention and packet recovery.

Figure 15:
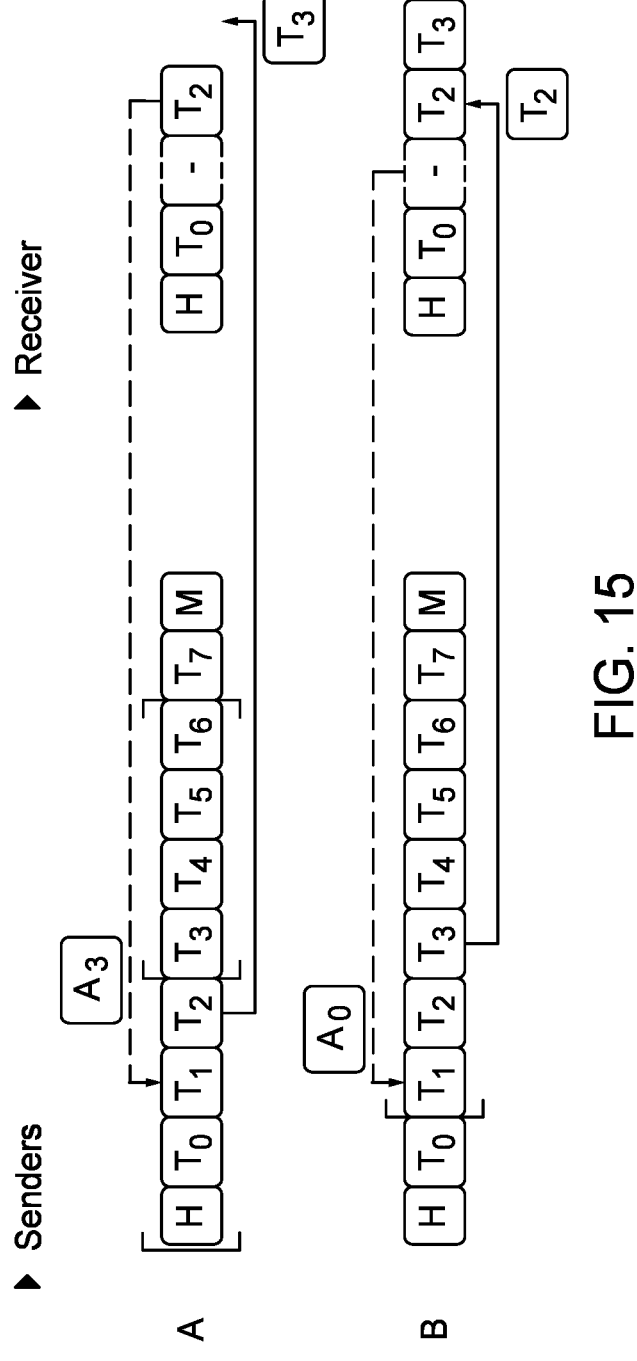
FIG. 15 illustrates a loss prevention scenario leveraging multiple senders, according to an example.

FIG. 15 illustrates a loss prevention scenario leveraging multiple senders, according to an example. In this example, the senders send the same message blocks (and same packets) to the receiver, but due to connection speeds, the packets may be received at different times at the receiver.

At Time A, the receiver receives the packet for Transaction 3, but the receiver is missing the packet for Transaction 1. Further, the receiver determines that this packet was received from the fastest sender. In this example, despite receiving an out of order packet, the receiver nonetheless acknowledges the current packet. Thus, the fastest sender does not know that the receiver is missing a packet but proceeds to send the next packet to the sender (e.g., the packet for Transaction 4).

At Time B, the receiver receives the packet for Transaction 2, which already has stored in its buffer. The receiver determines it is still missing the packet for Transaction 1. Further, it determines that the packet for Transaction 2 was received from the slowest sender. Instead of acknowledging the current packet, the receiver instead performs the method 800 to perform loss prevention and loss recovery. Referring to FIG. 8, because the receiver is not stalled, the receiver performs block 820 where it acknowledges the packet before the missing packet. If the sender receives M number of the same acknowledgement, then it will reseed the missing packet as discussed at block 830, or if the receiver stalls (because it has finished processing the packets for the header and Transaction 0) then the receiver will send an urgent request as described at block 840.

In this manner, the receiver can use the fastest sender to continue to fill the buffer but use the slowest sender to perform loss prevention and packet recovery.

Figure 16:
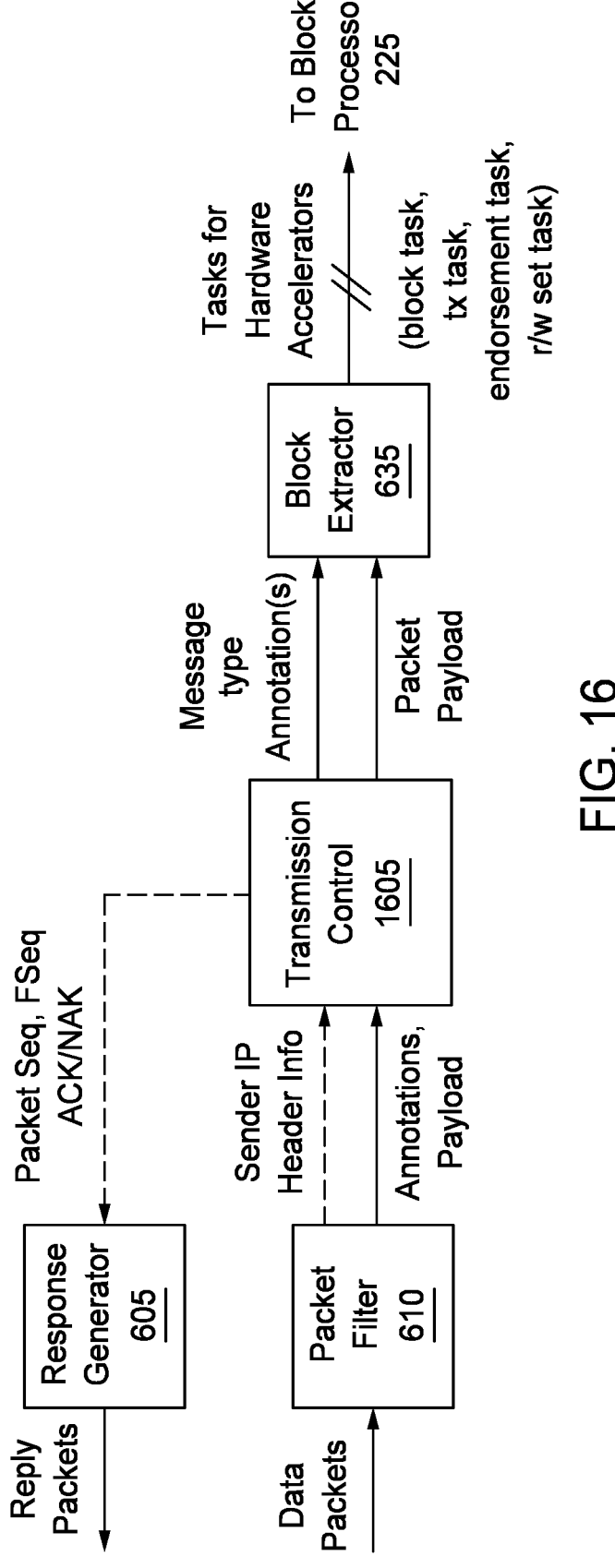
FIG. 16 illustrates a protocol processor with a transmission control, according to an example.

FIG. 16 illustrates a protocol processor 220 with a transmission control 1605, according to an example. The protocol processor 220 has many of the same hardware components as the protocol processor 220 in FIG. 6, where the same reference numbers indicate similar functionalities. However, the protocol processor 220 in FIG. 16 includes the transmission control 1605 that includes circuitry that can perform the techniques and methods described above in FIGS. 8-15.

The transmission control 1605 manages a receiving buffer (e.g., the buffer that stores the received packets as shown in FIGS. 9-13), controls a response generator to generate feedback packets, and passes ready to use message information and packet payload to the block extractor 615.

Figure 17:
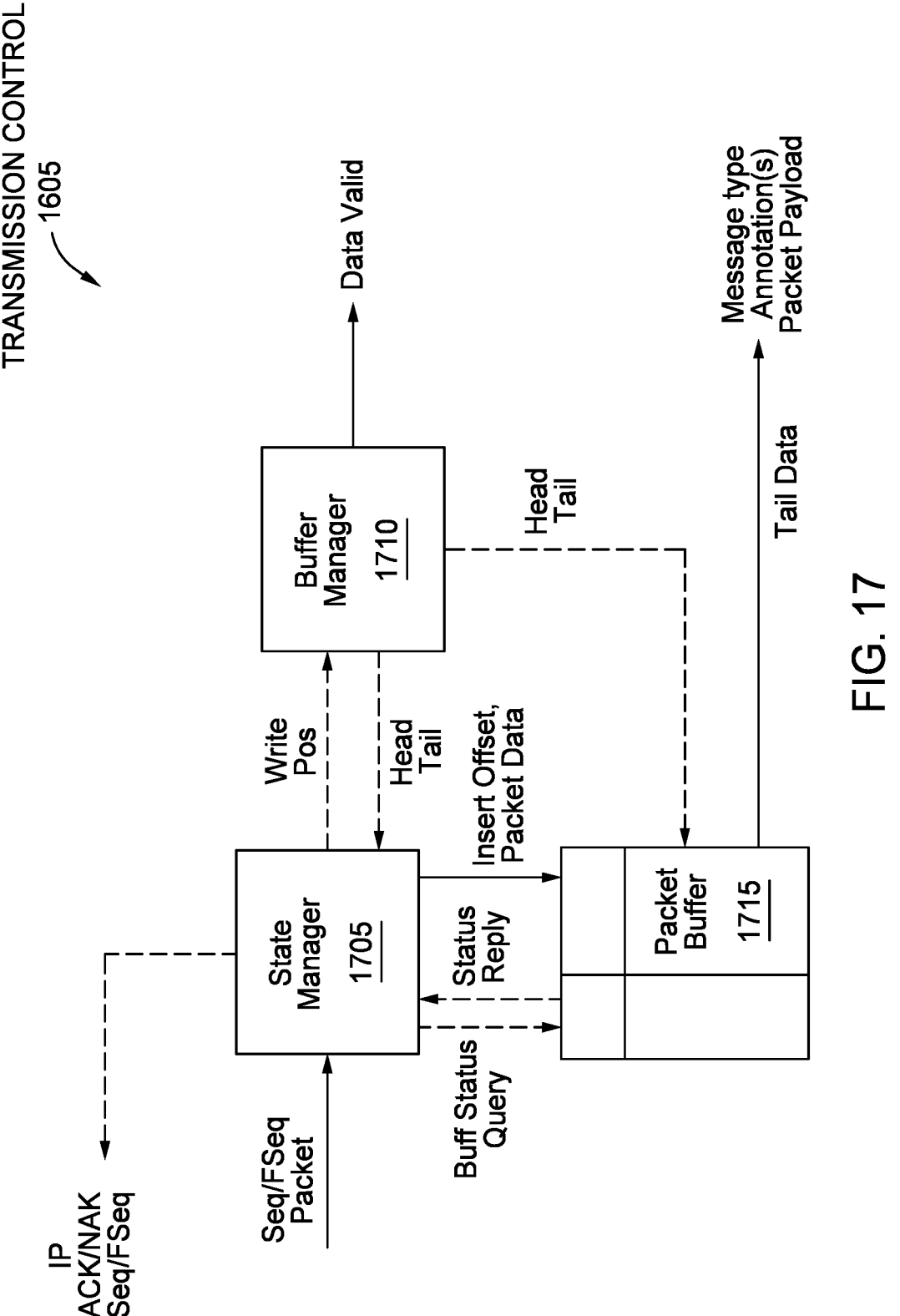
FIG. 17 illustrates details of the transmission control in FIG. 16, according to an example.

FIG. 17 illustrates details of the transmission control 1605 in FIG. 16, according to an example. The transmission control 1605 includes a packet buffer 1715, state manager 1705, and buffer manager 1710 which in one embodiment are hardware components containing circuitry.

In one embodiment, the packet buffer 1715 is a dual port memory with packet positions that can be accessed randomly. The packet buffer 1715 can store the data valid status, packet payload, the message types indicated in the packets, and the annotations of the packets.

The buffer manager 1710 maintains the head and tail of the packet buffer 1715. The head is the newest position to be written to while the tail is the older position not yet read from the buffer. The packet loss happens between the head and tail. In one embodiment, a new packet can only be written to a position between the head and tail. The tail moves to the next position once a packet is read. The head moves to the write position if a packet writes to a position between the head and tail. The buffer manager 1710 outputs a data valid signal if the current tail has data to be read. This indicates to the downstream block processor that it can retrieve the packet at the tail to be processed. Moreover, the buffer manager 1710 can mark the buffer valid or invalid.

The state manager 1705 maintains the fastest sender status and the slowest sender status to perform the techniques described in FIG. 15. Further, the state manager 1705 is tasked with communicating with the sender (or senders in a multi-sender communication system) by sending the acknowledgements and urgent requests. The state manager 1705 receives the sender status that includes the sender IP address, sequence number, and fragmentation sequence number of the newest packet. In one embodiment, the state manager 1705 performs a linear switch between the tail and head to find the correct position of incoming packets, inserts the new packets, and notifies the buffer manager.

The state manager 1705 also can use the method 800 and the embodiments discussed in FIG. 15 to perform loss prevention and packet recovery when transmitting the ACK and NA/NAK signals to the sender(s).

While FIGS. 16 and 17 illustrate a hardware implementation of performing the embodiments described in FIGS. 8-14, these embodiments can also be implemented using software instead.

In the preceding, reference is made to embodiments presented in this disclosure. However, the scope of the present disclosure is not limited to specific described embodiments. Instead, any combination of the described features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the preceding aspects, features, embodiments and advantages are merely illustrative and are not considered elements or limitations of the appended claims except where explicitly recited in a claim(s).

As will be appreciated by one skilled in the art, the embodiments disclosed herein may be embodied as a system, method or computer program product. Accordingly, aspects may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium is any tangible medium that can contain, or store a program for use by or in connection with an instruction execution system, apparatus or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described below with reference to flowchart illustrations and/or block diagrams of methods, apparatus (systems) and computer program products according to embodiments presented in this disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods, and computer program products according to various examples of the present invention. In this regard, each block in the flowchart or block diagrams may represent a module, segment, or portion of instructions, which comprises one or more executable instructions for implementing the specified logical function(s), in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing is directed to specific examples, other and further examples may be devised without departing from the basic scope thereof, and the scope thereof is determined by the claims that follow.

What is claimed is:

1. A computing system, comprising:
a processor;
memory storing a ledger of a blockchain; and
a hardware accelerator configured to:
    receive, from a plurality of senders, a plurality of packets corresponding to a block of transactions to be committed to the ledger;
    in response to a first packet of the plurality of packets being received out of order relative to a defined sequence for the block of transactions, transmit, to a slower sender of the plurality of senders, an acknowledgement for a second packet of the plurality of packets that was earlier in the defined sequence than a missing packet;
    receive the missing packet; and
    transmit an acknowledgement of the first packet to a faster sender of the plurality of senders;
wherein one of the processor or the hardware accelerator is configured to, upon determining the block of transactions is valid, commit the block of transactions to the ledger.

2. The computing system of claim 1, wherein the hardware accelerator comprises at least one of a system on a chip (SoC), a field programmable gate array (FPGA), or an application specific integrated circuit (ASIC).

3. The computing system of claim 1, wherein the hardware accelerator is configured to:
transmit multiple copies of the acknowledgement for the second packet upon receiving multiple out-of-order packets, wherein the sender is configured to resend the missing packet only after receiving a predefined number of the copies of the acknowledgement for the second packet; and after receiving the missing packet, receive a third packet of the plurality of packets that is later in the defined sequence than the first packet, wherein the computing system does not receive another copy of the first packet from the sender.

4. The computing system of claim 1, wherein the hardware accelerator is configured to:

in response to determining (i) a third packet of the plurality of packets is received out of order relative to the defined sequence for the block of transactions and (ii) the hardware accelerator is stalled waiting on a second missing packet, transmit an urgent request to a sender indicating the sender resend the second missing packet immediately.

5. The computing system of claim 4, wherein the hardware accelerator is configured to:

receive, from the sender, the missing packet without also receiving another copy of the third packet.

6. The computing system of claim 4, wherein the hardware accelerator is configured to:

transmit multiple copies of the urgent request to the sender in response to receiving multiple out-of-order packets;

receive, from the sender, the missing packet as well as another copy of the third packet, wherein the sender is configured to reset its sending window in response to receiving a predefined number of the multiple copies of the urgent request from the hardware accelerator.

7. The computing system of claim 6, wherein the hardware accelerator is configured to:

receive the plurality of packets for the block of transactions from a plurality of senders;

identify a faster sender and a slower sender of the plurality of senders;

upon determining an out-of-order packet is received from the faster sender, transmit an acknowledgement of the out-of-order packet to the faster sender; and upon determining the out-of-order packet is received from the slower sender, transmit an acknowledgement for a previous packet that was received by the hardware accelerator before a second missing packet.

8. The computing system of claim 1, wherein the block of transactions comprises a block header, a plurality of transactions, and metadata, wherein the block header, each of the plurality of transactions, and the metadata are sent in a different ones of the plurality of packets.

9. The computing system of claim 8, wherein at least one of the plurality of transactions is transmitted to the computing system using at least two of the plurality of packets, wherein the least two of the plurality of packets do not contain data from any of the other ones of the plurality of transactions.

10. An integrated circuit, comprising:

a protocol processor configured to:

receive, from a plurality of senders, a plurality of packets corresponding to a block of transactions;

in response to a first packet of the plurality of packets being received out of order relative to a defined sequence for the block of transactions, transmit, to a slower sender of the plurality of senders, an acknowledgement for a second packet of the plurality of packets that was earlier in the defined sequence than a missing packet;

receive the missing packet; and transmit an acknowledgement of the first packet to a faster sender of the plurality of senders; and a block processor configured to validate the block of transactions in an order dictated by the defined sequence.

11. The integrated circuit of claim 10, wherein the protocol processor is configured to:

transmit multiple copies of the acknowledgement for the second packet upon receiving multiple out-of-order packets, wherein the sender is configured to resend the missing packet only after receiving a predefined number of the copies of the acknowledgement for the second packet;

after receiving the missing packet, receive a third packet of the plurality of packets that is later in the defined sequence than the first packet, wherein the integrated circuit does not receive another copy of the first packet from the sender.

12. The integrated circuit of claim 10, wherein the protocol processor is configured to:

in response to determining (i) a third packet of the plurality of packets is received out of order relative to the defined sequence for the block of transactions and (ii) a hardware accelerator is stalled waiting on a second missing packet, transmit an urgent request to a sender indicating the sender resend the second missing packet immediately.

13. The integrated circuit of claim 12, wherein the protocol processor is configured to:

receive, from the sender, the missing packet without also receiving another copy of the third packet.

14. The integrated circuit of claim 12, wherein the protocol processor is configured to:

transmit multiple copies of the urgent request to the sender in response to receiving multiple out-of-order packets;

receive, from the sender, the missing packet as well as another copy of the third packet, wherein the sender is configured to reset its sending window only after receiving a predefined number of the multiple copies of the urgent request from the integrated circuit.

15. The integrated circuit of claim 10, wherein the protocol processor is configured to:

receive the plurality of packets for the block of transactions from a plurality of senders;

identify a faster sender and a slower sender of the plurality of senders;

upon determining an out-of-order packet is received from the faster sender, transmit an acknowledgement of the out-of-order packet to the faster sender; and upon determining the out-of-order packet is received from the slower sender, transmit an acknowledgement for a previous packet that was received by the protocol processor before a missing packet.

16. The integrated circuit of claim 10, wherein the block of transactions comprises a block header, a plurality of transactions, and metadata, wherein the block header, each of the plurality of transactions, and the metadata are sent in a different ones of the plurality of packets.

17. The integrated circuit of claim 16, wherein at least one of the plurality of transactions is transmitted to the integrated circuit using at least two of the plurality of packets, wherein the least two of the plurality of packets do not contain data from any of the other ones of the plurality of transactions.

18. A method, comprising:

receiving, from a plurality of senders, a plurality of packets corresponding to a block of transactions;

in response to a first packet of the plurality of packets being received out of order relative to a defined sequence for the block of transactions, transmitting, to a slower sender of the plurality of senders, an acknowledgement for a second packet of the plurality of packets that was earlier in the defined sequence than a missing packet;

receiving the missing packet;

transmitting an acknowledgement of the first packet to a faster sender of the plurality of senders; and validating the block of transactions in an order dictated by the defined sequence.

19. The method of claim 18, further comprising:

transmitting multiple copies of the acknowledgement for the second packet upon receiving multiple out-of-order packets, wherein the sender resends the missing packet only after receiving a predefined number of the copies of the acknowledgement for the second packet; and after receiving the missing packet, receiving a third packet of the plurality of packets that is later in the defined sequence than the first packet without receiving another copy of the first packet from the sender.

20. The method of claim 18, further comprising:

in response to determining (i) a third packet of the plurality of packets is received out of order relative to the defined sequence for the block of transactions and (ii) a hardware accelerator is stalled waiting on a second missing packet, transmitting an urgent request to a sender indicating the sender resend the second missing packet immediately.

\* \* \* \* \*